United States Patent
Ueno et al.

(10) Patent No.: US 7,584,015 B2
(45) Date of Patent: Sep. 1, 2009

(54) METHOD FOR DESIGNING MOLD, MOLD AND MOLDED PRODUCT

(75) Inventors: Yasunori Ueno, Tokyo (JP); Yoshiyuki Sato, Tokyo (JP)

(73) Assignee: Hoya Corporation, Tokyo (JP)

( * ) Notice: Subject to any disclaimer, the term of this patent is extended or adjusted under 35 U.S.C. 154(b) by 233 days.

(21) Appl. No.: 11/596,537

(22) PCT Filed: May 31, 2005

(86) PCT No.: PCT/JP2005/009997
§ 371 (c)(1),
(2), (4) Date: Nov. 15, 2006

(87) PCT Pub. No.: WO2005/115712
PCT Pub. Date: Dec. 8, 2005

(65) Prior Publication Data
US 2008/0042307 A1    Feb. 21, 2008

(30) Foreign Application Priority Data

| May 31, 2004 | (JP) | 2004-162461 |
| Jun. 3, 2004 | (JP) | 2004-166158 |
| Jun. 3, 2004 | (JP) | 2004-166164 |
| Jul. 8, 2004 | (JP) | 2004-202315 |

(51) Int. Cl.
*G06F 19/00* (2006.01)
*G05B 13/02* (2006.01)
*G06F 17/10* (2006.01)
*B29D 11/00* (2006.01)

(52) U.S. Cl. .......... 700/204; 700/30; 700/97; 700/110; 703/2; 264/2.2; 425/175

(58) Field of Classification Search ......... 700/28–30, 700/97, 98, 108–110, 173, 174, 146, 157–158, 700/197, 204; 264/2.2, 2.5, 2.7; 703/2; 359/642; 425/175
See application file for complete search history.

(56) References Cited

U.S. PATENT DOCUMENTS 6,129,435 A * 10/2000 Reichow et al. ............... 351/41
(Continued)

FOREIGN PATENT DOCUMENTS

JP    A 4-232706    8/1992
(Continued)

*Primary Examiner*—Sean P Shechtman
(74) *Attorney, Agent, or Firm*—Oliff & Berridge, PLC

(57) ABSTRACT

A molded product from a mold, the mold for molding a molded product in a desired shape can be designed with high precision by correcting a shape change of the molded product. A mold in which use surfaces of an upper mold and a lower mold are formed to be design curved surfaces of an optical lens is prepared. A curved surface shape of the optical lens molded from this mold is measured, and a measured value is approximated by equation (1). The curved surface of the optical lens specified by the equation and a design curved surface are compared to obtain an error between both the curved surfaces. Information corresponding to the error is used as correction information, and the use surfaces in the upper mold and the lower mold are corrected and designed.

$$Z = \frac{C\rho^2}{1 + \sqrt{1-(1+K)C^2\rho^2}} + \sum_{i=2}^{n} A_{2i}\rho^{2i} \quad (1)$$

8 Claims, 12 Drawing Sheets

U.S. PATENT DOCUMENTS

| | | | |
|---|---|---|---|
| 7,082,387 B1 * | 7/2006 | Wolfe, Jr. | 703/6 |
| 7,251,538 B2 * | 7/2007 | Ueno et al. | 700/97 |
| 2002/0042690 A1 | 4/2002 | Shimbo | |
| 2003/0018408 A1 * | 1/2003 | Sagae et al. | 700/200 |

FOREIGN PATENT DOCUMENTS

| | | | |
|---|---|---|---|
| JP | A 5-096572 | 4/1993 | |
| JP | A 8-216272 | 8/1996 | |
| JP | A 2002-096344 | 4/2002 | |
| JP | A 2002-248666 | 9/2002 | |
| JP | A 2003-117925 | 4/2003 | |

* cited by examiner (A)

(B)

(C)

(a)

(b)

METHOD FOR DESIGNING MOLD, MOLD AND MOLDED PRODUCT

TECHNICAL FIELD

The present invention relates to a mold designing method for designing a mold with which a molded product in a desired shape is molded by correcting a shape change of the molded product when molding the molded product (for example, an optical lens) from the mold, a mold designed by the mold designing method, and a molded product molded by the mold.

BACKGROUND ART

In molding an optical lens, when a mold is designed and produced by using design values of the optical lens for the mold as they are, the optical lens produced with the mold sometimes is not produced in the same shape as that of the design values. This is because of mold shrinkage dependent on the material, stress due to the shape of the optical lens and the like, and because a mold surface of the mold is not transferred to a lens surface with high precision.

For example, when molding is performed by using a mold having a spherical molding surface to mold a spherical lens, the molded optical lens sometimes has a surface shape other than a spherical surface including an aspherical shape. Therefore, in designing a mold, it is necessary to add a proper shape correction to the mold in consideration of these various factors.

Correction values of the molding surfaces of these molds differ in each refractive power of optical lenses, lens material, and shape of the design curved surface, and have complicated tendency by combination of them. In order to determine a suitable correction value, it is necessary to experimentally verify the actual deformation in each mold.

Further, prediction and quantification of the correction value are difficult, and a skill is required in determination of a proper correction value.

A concrete operation includes: (a) molding all kinds of optical lenses with the corresponding molds by tests, and (b) measuring errors with respect to the designing values of the optical lenses; (c) calculating temporary correction values (empirical values) by multiplying the measured errors by various coefficients and remaking the molds; (d) molding optical lenses with the remade molds by tests again, and (e) measuring the shape errors of the optical lenses. It is a general method to repeat the above-described (c) to (e) to optimize correction.

In order to perform the operation of optimizing such shape correction of a mold, however, a large number of molding tests are required. Especially in the case of spectacle lenses, various kinds of molds are required. Namely, the spectacle lenses, lenses corresponding to prescriptions of the individual spectacle-lenses wearers have to be prepared. For example, when the range of the refractive power at the vertex of a spherical diopter is −8.00 diopter (D) to +6.00 diopter (D), and the division unit of the refractive power is 0.25 D pitch, as for the diopter range of the spectacle lenses corresponding to the prescriptions, the number of kinds of spherical diopters is 56.

Further, in the case of the cylindrical refractive power corresponding to an astigmatic prescription being in the range of 0.25 diopter (D) to 2.00 diopter (D), when the division unit of refractive power is 0.25 D pitch, eight kinds are required as the kind of astigmatism. Therefore, when the spherical prescription and astigmatic prescription are combined, it is necessary for a product to prepare for 448 kinds of lens diopters, and since the mold is composed of two molds that are upper and lower molds, the number of kinds of molds becomes 896 in total.

For this reason, in production of molds, the operation of shape correction for each mold as described above is performed, and therefore, a long manufacturing period is required.

Meanwhile, as for a method for making correction which is added to the molding surface of a mold, there is known a method for correcting a mold by obtaining a spherical shape having a single curvature by using the least squares method so that errors of the molded optical lens and the design values of the optical lens become the minimum, and by using the curvature of the spherical shape as an average curvature (the first prior art).

Further, as the second prior art, there is a method for applying a predicted value as a correction value when deformation in consideration of shrinkage is predictable in the case of a simple shape (Patent Document 1).

Further, as the third prior art, there is a method for making correction based on a shape error measurement value which is obtained by measuring a three-dimensional shape by an aspherical surface measuring machine, obtaining a shape error from the designing values, and excluding a setting error with respect to the measuring machine from the shape error (Patent Document 2).

[Patent Document 1] Japanese Patent Application Laid-open No. 2003-117925

[Patent Document 2] Japanese Patent Application Laid-open No. 8-216272

DISCLOSURE OF THE INVENTION

Problems to be Solved by the Invention

However, in the evaluation of an error by the average curvature in the first prior art, shape error other than a spherical shape cannot be evaluated, and therefore, the shape errors of the shapes other than the spherical shapes cannot be corrected.

In the case of designing of the mold of an optical lens by using the second prior art, for example, in the case of a spectacle lens, the spectacle lens has a meniscus shape composed of a convex surface and a concave surface, and the shape is complicated; therefore, it is difficult to design the mold by predicting a transformation value with shrinkage taken into consideration.

Further, in the third prior art, a measurement error is excluded, but the shape error measurement value includes influence of roughness of a lens surface, foreign matters attached to the lens surface and the like as noise. Therefore, the noise other than the shape error is reflected on the correction value, and precision of correction is lowered, thus there is a possibility of being incapable of molding an optical lens from the mold with high precision.

In view of the above-described circumstances, an object of the present invention is to provide a mold with which a molded product in a desired shape is molded by correcting a shape change of the molded product when the molded product is molded from the mold, and a method for designing the mold.

Another object of the present invention is to provide a molded product by using the aforesaid mold.

Means for Solving the Problems

A method for designing a mold according to a first construction is characterized by comprising preparing a mold of which molding surface is formed to be a design curved surface of a molded product, measuring a curved surface shape of a molded product which is molded from the mold, and specifying a curved surface of the above-described molded product by approximating the measured value by an equation of an aspherical surface, comparing the curved surface of the above-described molded product which is specified by the equation of the aspherical surface and the design curved surface of the above-described molded product to obtain an error of both the curved surfaces, and correcting the above-described molding surface of the above-described mold to design it by using information corresponding to the error as correction information.

The method for designing a mold according to a second construction is, in the invention described in the first construction, characterized in that the above-described correction information includes entire shape correction information correcting an entire shape of the molding surface of the mold to cope with an error of a spherical shape component in the curved surface of the molded product, and local shape correction information which corrects a local shape of the above-described molding surface of the above-described mold to cope with an error of a component other than the spherical shape in the curved surface of the molded product.

The method for designing a mold according to a third construction is, in the invention described in the first or the second construction, characterized in that the above-described equation of the aspherical surface is a polynomial including a spherical shape component in the curved surface of the molded product and a component other than the spherical shape in the curved surface of the molded product.

The method for designing a mold according to a fourth construction is, in the invention described in any one of the first to the third constructions, characterized in that the above-described equation of the aspherical surface adds a spherical shape component in the curved surface of the molded product and a component other than that of the spherical shape in the curved surface of the molded product.

The method for designing a mold according to a fifth construction is, in the invention described in any one of the first to the fourth constructions, characterized in that the above-described equation of the aspherical surface is the following equation (1), where Z is a distance measured from a vertex of the molded product in an axial direction of the molded product, $\rho$ satisfies $\rho^2 = X^2 + Y^2$ when X and Y are distances measured in a perpendicular direction to the above-described axis from the above-described vertex, a vertex curvature C satisfies C=1/R when R is the radius of curvature at the vertex, K is a conic coefficient, and $A_{2i}$ is an aspherical coefficient (i is an integer).

[Mathematical Expression 1]

$$Z = \frac{C\rho^2}{1 + \sqrt{1 - (1+K)C^2\rho^2}} + \sum_{i=2}^{n} A_{2i}\rho^{2i} \quad (1)$$

The method for designing a mold according to a sixth construction is, in the invention described in the fifth construction, characterized in that in the above-described aspherical coefficient $A_{2i}$, i is 2 to 5.

The method for designing a mold according to a seventh construction is, in the invention described in the fifth construction, characterized by further comprising obtaining the entire shape correction information correcting the entire shape of the molding surface of the mold to cope with the error of the spherical shape component in the curved surface of the molded product, according to a reference spherical component which is a first term (K=0) of the above-described equation (1), and obtaining the local shape correction information correcting a local shape of the above-described molding surface of the above-described mold to cope with the error of a component other than the spherical shape in the curved surface of the molded product, according to a polynomial component which is a second term of the above-described equation (1).

The method for designing a mold according to an eighth construction is, in the invention described in the seventh construction, characterized in that the entire shape correction information in the molding surface of the above-described mold is determined based on a difference between a radius of curvature of a reference spherical surface expressed by the reference spherical surface component which is the first term (K=0) of the equation (1) and a radius of curvature in the design curved surface of the molded product.

The method for designing a mold according to a ninth construction is, in the invention described in the seventh or the eighth construction, characterized in that the local shape correction information in the molding surface of the above-described mold is determined based on a shape change rate which is expressed by the polynomial component that is the second term of the equation (1) and is calculated by using a height (Z value) of a component other than that of the spherical shape in the curved surface of the molded product, and a height (Z value) of the design curved surface of the above-described molded product.

The method for designing a mold according to a tenth construction is, in the invention described in any one of the seventh to the ninth constructions, characterized in that design of the molding surface of the above-described mold is carried out by adding the entire shape correction information and the local shape correction information to the design curved surface of the molded product.

The method for designing a mold according to an eleventh construction is, in the invention described in any one of the first to the tenth constructions, characterized in that the above-described equation of the aspherical surface is the following equation (2) which is obtained by transforming the following equation (1).

[Mathematical expression 2]

$$Z = \frac{C\rho^2}{1 + \sqrt{1 - (1+K)C^2\rho^2}} + \sum_{i=2}^{n} A_{2i}\rho^{2i} \quad (1)$$

[Mathematical expression 3]

$$Z = \sum_{i=1}^{n} B_{2i}\rho^{2i} \quad (2)$$

The method for designing a mold according to a twelfth construction is, in the invention described in the eleventh construction, characterized by further comprising obtaining the vertex curvature C and an aspherical coefficient $A_{2n}$ of the equation (1) from a coefficient $B_{2n}$ of the above-described equation (2) and determining the curved surface of the molded product by the equation (1), obtaining the entire shape correction information correcting the entire shape of the molding surface of the mold to cope with an error of the spherical shape component in the curved surface of the molded product, according to the reference spherical component which is the first term (K=0) of the equation (1), and obtaining the local shape correction information correcting the local shape of the above-described molding surface of the above-described mold to cope with the error of a component other than the spherical shape in the curved surface of the molded product, according to the polynomial component that is the second term of the above-described equation (1).

The method for designing a mold according to a thirteenth construction is, in the invention described in any one of the first to the twelfth constructions, characterized in that measurement of the curved surface shape of the above-described molded product comprises preparing a mold with a curved surface measuring mark provided on the molding surface, and measuring the curved surface shape of the molded product molded from the mold, and on this occasion, measuring the above-described curved surface shape with a transfer mark, which is formed by the above-described mark being transferred onto the curved surface of the molded product and is located at a spot to be measured, as a reference.

The method for designing a mold according to a fourteenth construction is, in the invention described in the thirteenth construction, characterized in that the above-described transfer mark has a vertex transfer mark part formed at a vertex of the curved surface of the molded product, and edge part transfer mark parts formed at positions which are point-symmetrical with respect to the above-described vertex and at edge parts of the above-described curved surface, and measures the above-described curved surface of the above-described molded product by passing the vertex transfer mark part and the edge part transfer mark parts.

The method for designing a mold according to a fifteenth construction is, in the invention described in the fourteenth construction, characterized in that a pair of or a plurality of pairs of the above-described edge part transfer mark parts are formed at positions which are point-symmetrical with respect to the vertex of the curved surface of the molded product.

The method for designing a mold according to a sixteenth construction is, in the invention described in any one of the first to the fifteenth constructions, characterized in that the above-described molded product is an optical lens of which curved surface is in a spherical shape or an aspherical shape.

The mold according to a seventeenth construction is formed by carrying out the method for designing a mold according to any one of the first to the sixteenth constructions.

The molded product according to an eighteenth construction is formed by using the mold described in the seventeenth construction.

The molded product according to a nineteenth construction is characterized in that the molded product described in the eighteenth construction is a spectacle lens in a meniscus shape.

The molded product according to a twentieth construction is characterized in that the molded product is a spectacle lens symmetrical with respect to a center.

ADVANTAGEOUS EFFECT OF THE INVENTION

According to the invention described in any one of the first to the sixth, and the sixteenth constructions, the curved shape of the molded product molded from the mold is measured, and the curved surface of the molded product is specified as the aspherical surface by approximating the measured value by the equation of the aspherical surface. Therefore, among the curved surfaces of the molded product, not only the spherical component but also the components other than the spherical surface can be quantified and specified by being approximated by the equation of the aspherical surface. Therefore, the error between the curved surface of the molded product specified to be the aspherical surface, and the design curved surface of the molded product is the error in which the spherical shape component and the component other than the spherical shape are accurately taken, and the correction information corresponding to the error becomes accurate, thus making it possible to precisely correct the molding surface of the mold to design the mold.

Besides, the measured value of the curved surface shape of the molded product is approximated by the equation of the aspherical surface, and thereby the curved shape of the above-described molded product is quantified and specified as the aspherical surface. Therefore, only the surface shape of the curved surface of the molded product can be extracted by excluding noises such as a measurement error included in the measured value and surface roughness of the curved surface of the molded product. Therefore, correction of the molding surface of the mold is facilitated and the mold can be designed.

According to the invention described in any one of the seventh to the tenth constructions, the entire shape correction information correcting the entire shape of the molding surface of the mold is obtained to cope with the error (error of the average surface refractive power) of the spherical shape component in the curved surface of the molded product, according to the reference spherical component of the first term (K=0) of the equation (1). Further, the local shape correction information correcting the local shape of the above-described molding surface of the above-described mold is obtained to cope with the error of the component other than the spherical shape in the curved surface of the molded product, according to the polynomial component which is the second term of the above-described equation (1). In this manner, the entire shape correction information and the local shape correction information are separately and independently obtained, whereby the error of the molded product (error of the spherical shape component and the error of the component other than the spherical shape) is precisely reflected in the correction information, and suitable correction is made to be able to design the above-described mold.

According to the invention described in the eleventh or the twelfth construction, the curved surface of the above-described molded product is specified by approximating the measured value obtained by measuring the curved shape of the molded product by the equation (2) that is the equation of the aspherical surface. Accordingly, as compared with the case where the curved surface of the molded product is specified by using the equation (1) which is difficult to handle with a calculator, the curved surface can be easily specified, and the coefficient $B_{2n}$ of the equation (2) can be quickly calculated. Therefore, the correction information corresponding to the deformation (error) of the molded product is easily calculated, and the mold for molding the molded product in a desired shape can be easily designed.

According to the invention described in the thirteenth or the fourteenth construction, the transfer mark which is formed by transferring the mark on the molding surface of the mold onto the curved surface of the molded product is located at the spot which should be measured in the curved surface of the molded product. Accordingly, on measuring the curved surface shape of the molded product molded from the mold, the curved surface shape of the above-described molded product is measured with the above-described transfer mark as a reference, and thereby, measurement of the curved surface shape of the molded product can be accurately conducted. As a result, the measured value is approximated by the equation of the aspherical surface to specify the curved surface of the molded product as the aspherical surface, and the correction information is calculated, whereby the molding surface of the mold is precisely designed and the mold can be designed.

According to the invention described in the fifteenth construction, a pair of or a plurality of pairs of edge part transfer marks are formed at a point-symmetrical position with respect to the vertex of the curved surface of the molded product. Accordingly, for example, two pairs of edge part transfer marks can be formed by orthogonalizing the straight lines which respectively connect the two pairs of edge part transfer marks. In this case, when the curved surface shape of the optical lens such as a toric lens is measured as a molded product, the curved shape of the optical lens can be accurately measured in a desired orthogonal direction with these edge part transfer marks as a reference. As a result, the mold with which the molded product in a desired shape is molded can be designed based on the measured value.

According to the invention described in any one of the seventeenth to the twentieth constructions, even when the molded product is deformed when the molded product is molded from the mold, the mold with which the molded product in a desired shape is molded can be designed with high precision, and therefore, the molded product in the desired shape can be molded and obtained by this mold.

BRIEF DESCRIPTION OF DRAWINGS

FIG. 10(A) is a graph in the case of the optical lens molded by using the mold designed by the method for designing the mold in the first embodiment, and FIG. 10(B) is a graph in the case of the optical lens molded by the mold which is designed by making correction by using an average curvature in a first prior art;

EXPLANATION FOR REFERENCES

Figure 1:
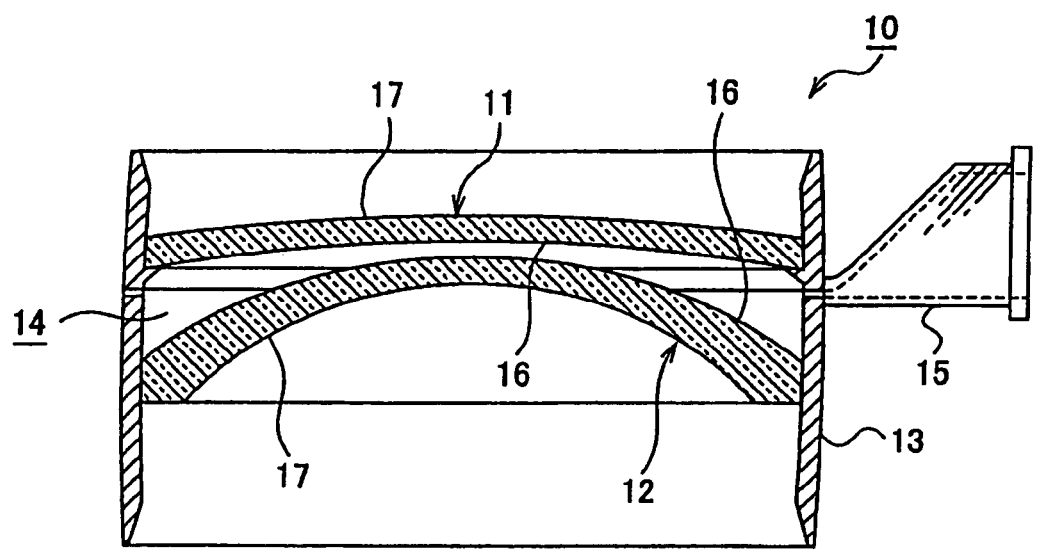
FIG. 1 is a sectional side view showing a mold having an upper mold and a lower mold which are produced by carrying out a first embodiment in a method for designing a mold according to the present invention.

10 A mold
11 A upper mold
12 A lower mold
16 use surfaces (a molded surface)
20 A designed curved surface
21 A molded curved surface
22, 23 A curved shape
30 An optical lens
31 A curved surface
32 A transfer mark
33 A vertex transfer mark part
34 A, 34 B peripheral part transfer mark parts
$A_{2i}$ A aspherical coefficient
$B_{2i}$ A coefficient
C A vertex curvature
$R_0$ A design radius of curvature at the vertex
R A radius of curvature at the vertex
O A vertex
P An optical axis

BEST MODE FOR CARRYING OUT THE INVENTION

Hereinafter, best modes for carrying out the present invention will be described based on the drawings.

[A] First Embodiment (FIG. 1 to FIG. 10)

Figure 5:
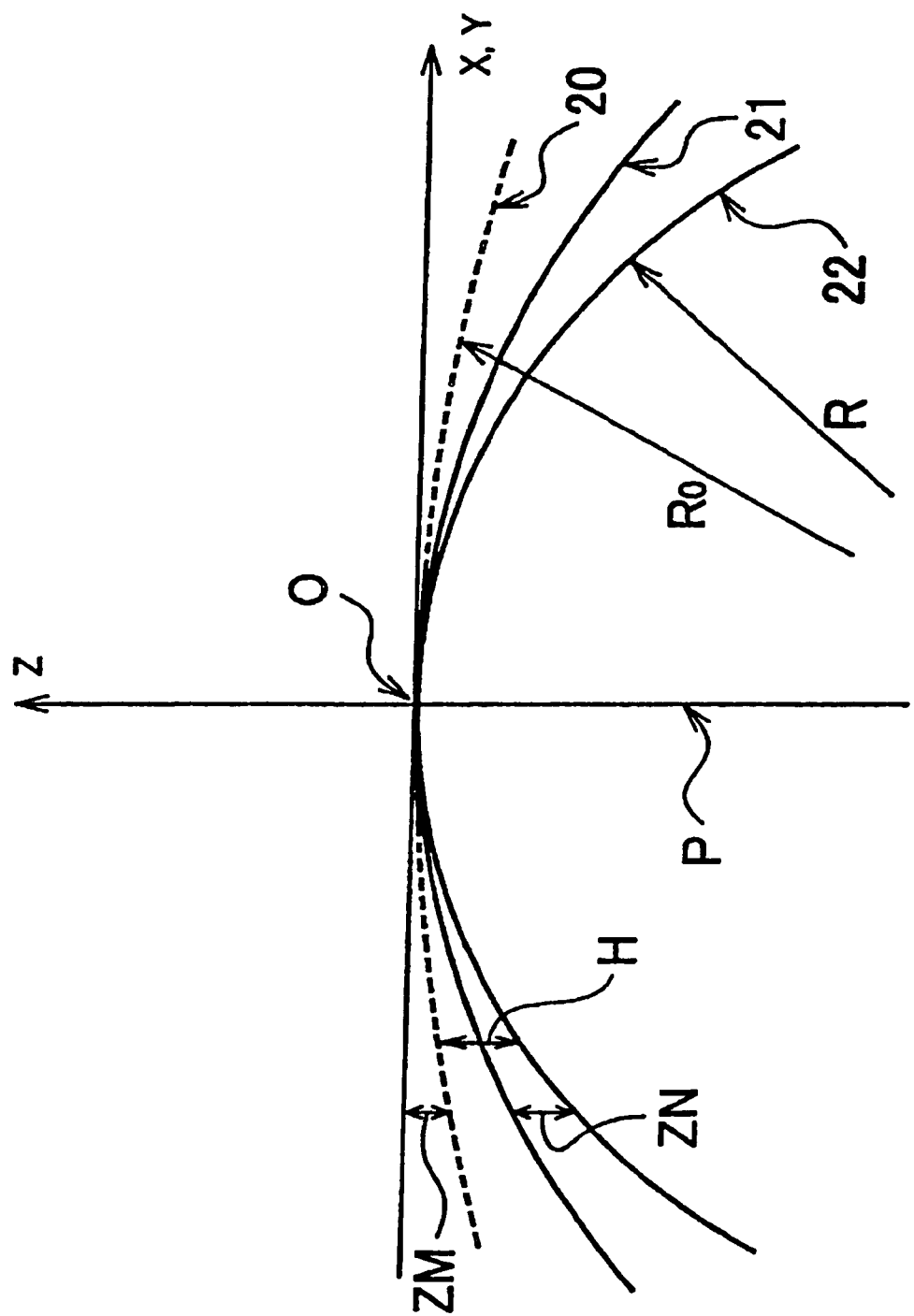
FIG. 5 is a graph showing a molded curved surface 21, a design curved surface 20 and the like of the optical lens which is a molded product molded by tests from the mold in FIG. 1.
Figure 6:
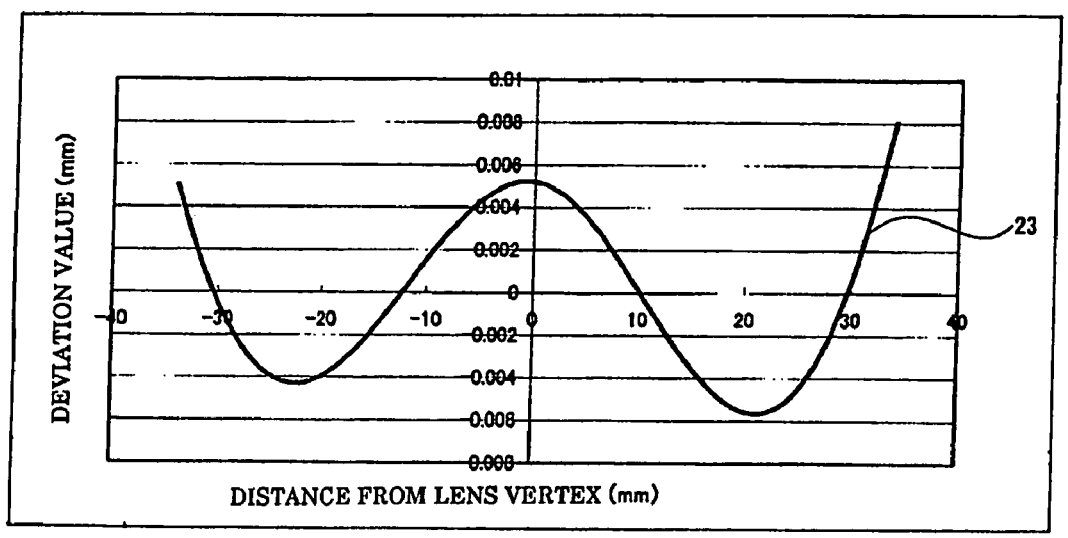
FIG. 6 is a graph showing a deviation amount by which a polynomial component of the molded curved surface 21 of the optical lens, which is molded by tests and specified by the equation (1), deviates with respect to the reference spherical surface component (curved surface shape 22) in FIG. 5.
Figure 7:
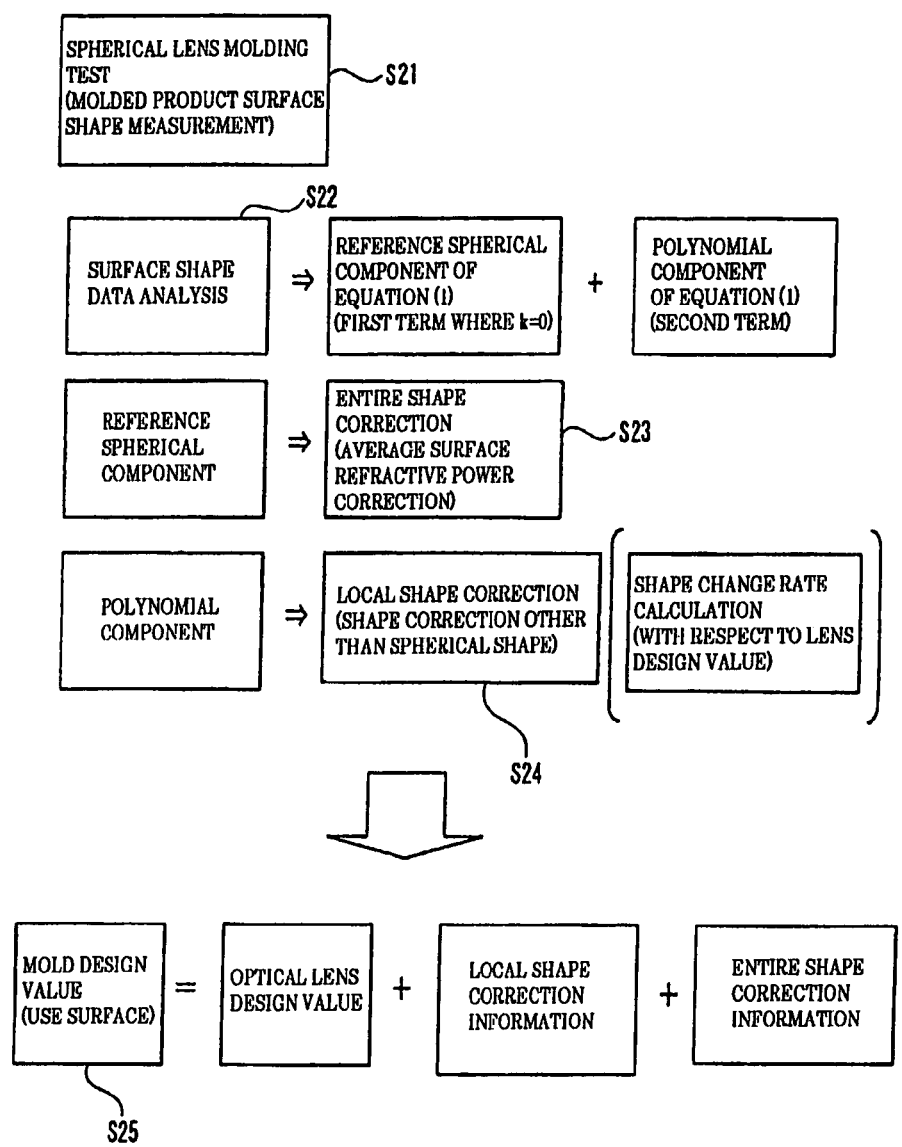
FIG. 7 is a schematic diagram showing calculation and the like of entire shape correction information and local shape correction information in a design process of the upper mold and the lower mold in FIG. 1.

FIG. 1 is a sectional side view showing a mold having an upper mold and a lower mold which are produced by carrying out the first embodiment in a method for designing a mold according to the present invention. FIG. 5 is a graph showing a molded curved surface, a design curved surface and the like of an optical lens which is a molded product molded by tests from the mold in FIG. 1. FIG. 7 is a schematic diagram showing calculation or the like of entire shape correction information and local shape correction information in the design process of the upper mold and the lower mold in FIG. 1.

(Explanation of Construction of Molding Mold for Producing Lens)

A mold 10 shown in FIG. 1 is for molding a plastic spherical lens by a manufacturing method called a cast method, and is constructed by including an upper mold 11, a lower mold 12 and a gasket 13. The above-described upper mold 11 and the lower mold 12 are collectively called a lens base mold.

The gasket 13 is formed of a resin having elasticity into a cylindrical shape, and holds the upper mold 11 and the lower mold 12 fluid-tightly at an inner peripheral surface to be spaced at a predetermined distance. A cavity 14 is constructed by being enclosed by the upper mold 11, the lower mold 12 and the gasket 13. The gasket 13 is integrally provided with an injection part 15 for injecting a monomer, which is a raw material of an optical lens into the cavity 14. A height of the gasket 13 is set at such a dimension as can ensure a thickness of a peripheral edge portion of the optical lens that is a molded product.

Figure 2:
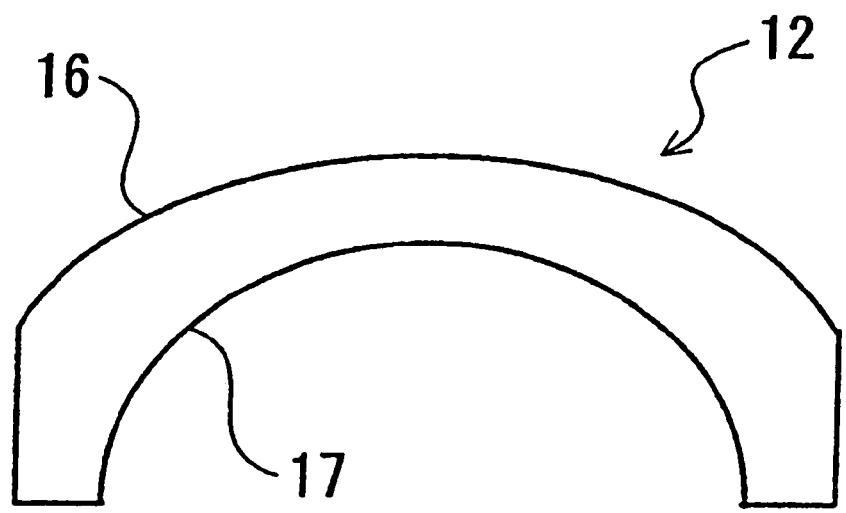
FIG. 2 is a sectional side view showing the lower mold in FIG. 1.

The upper mold 11 and the lower mold 12 are composed of glass or the like. The upper mold 11 is formed into a concave mold to form a curved surface (convex surface) of the optical lens. The lower mold 12 is formed into a convex mold to form a curved surface (concave surface) of the optical lens. In the upper mold 11 and the lower mold 12, a surface on which a lens curved surface of the optical lens is formed is called a use surface 16 and a surface on which the above-described lens curved surface is not formed is called a nonuse surface 17 as also shown in FIG. 2.

(Description of Method for Producing Optical Lens)

Figure 3:
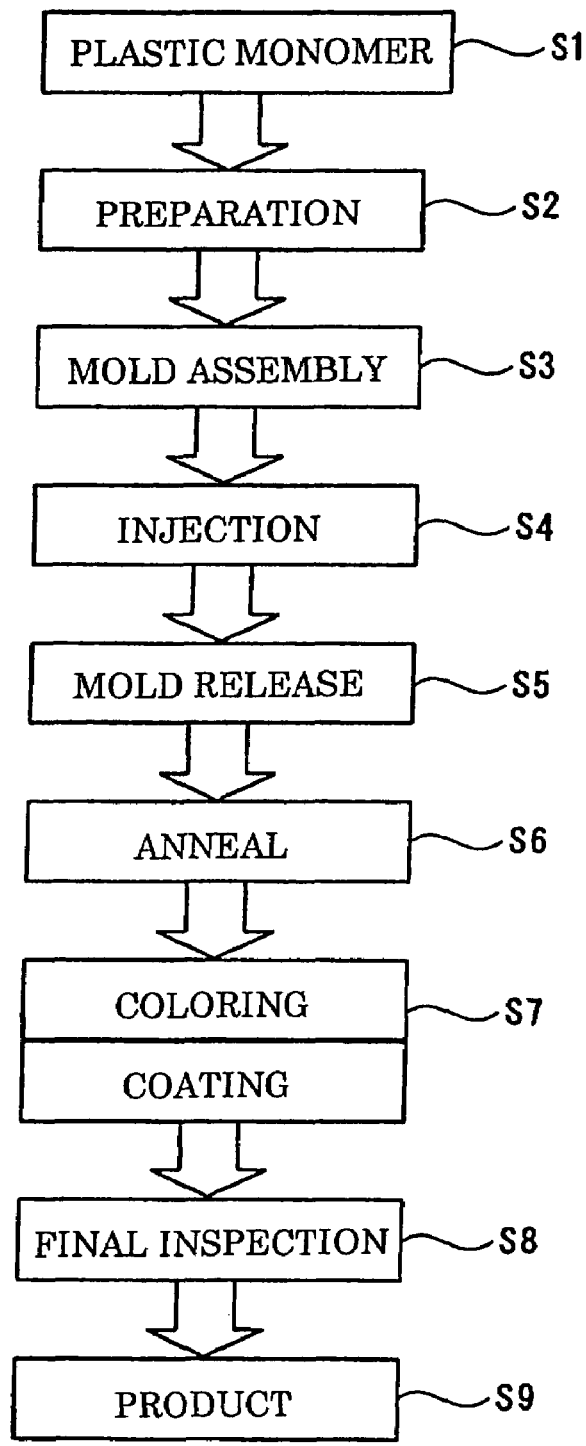
FIG. 3 is a flowchart showing a production procedure of an optical lens (plastic lens) using the mold in FIG. 1.

A manufacturing process of an optical lens using the above-described mold 10 will be described with reference to FIG. 3.

First, a monomer that is a raw material of the optical lens is prepared (S1). The monomer is a thermosetting resin, and a catalyst, an ultraviolet absorber and the like are added to the resin to be prepared, which is filtered with a filter (S2).

Next, the upper mold 11 and the lower mold 12 is assembled to the gasket 13 to complete the mold 10 (S3). Then, the monomer prepared as described above is injected into the cavity 14 of the mold 10, and is heat-polymerized and cured in an electric furnace (S4). As the polymerization of the monomer in the mold 10 is completed, the plastic optical lens is molded, and the optical lens is released from the mold 10 (S5).

After the release of the optical lens, heating treatment called anneal is carried out to remove distortion of an inside of the lens which is caused by polymerization (S6). Thereafter, visual inspection and projective inspection are carried out for the optical lens as intermediate inspection.

The optical lens is classified into a finished product and a semi-finished product (semi product) at this stage, and polishing of a second surface is performed for the semi-finished product in accordance with the prescription. For the finished product, a coloring process for obtaining a colored product, a reinforcement coating process for reinforcement against a damage, and an antireflection coating process for prevention of reflection are carried out thereafter (S7), and final inspection is carried out (S8). The finished product becomes a product after the final inspection (S9).

Figure 4:
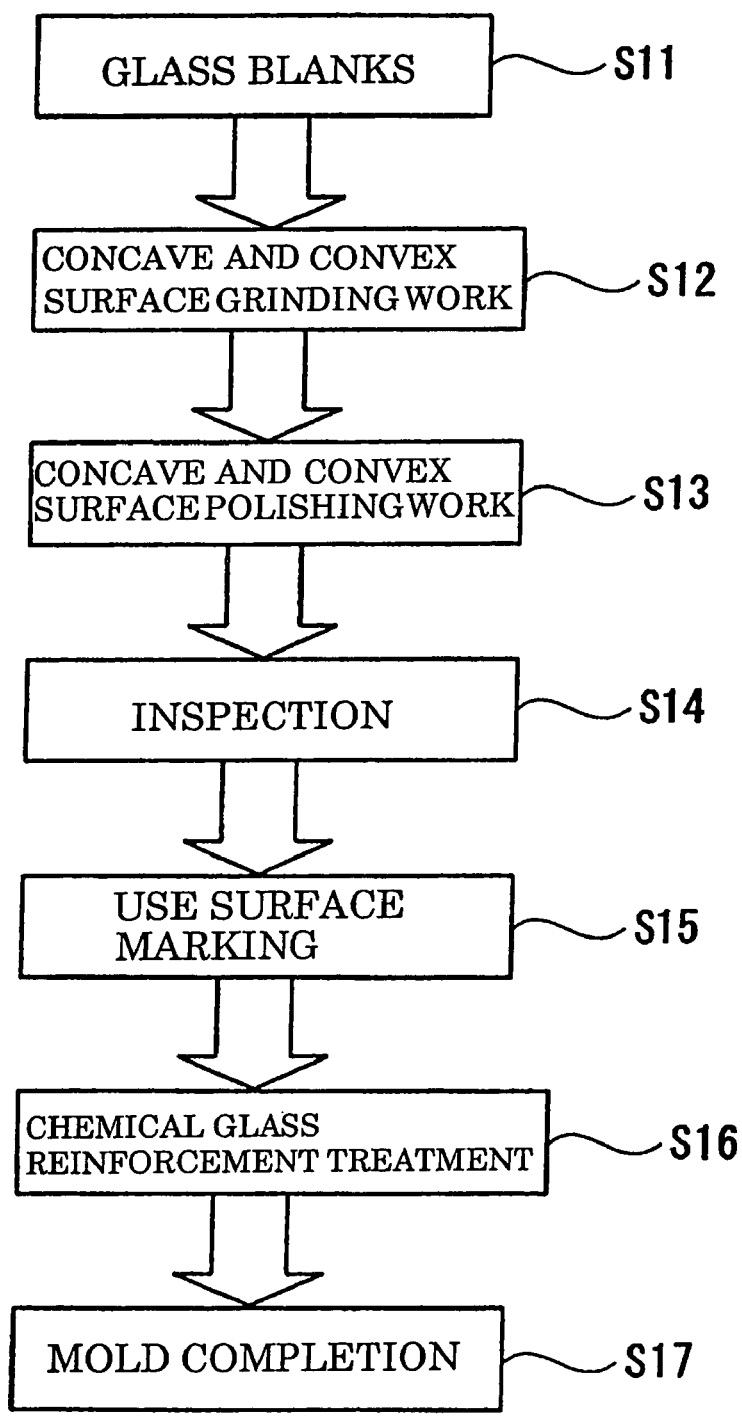
FIG. 4 is a flowchart showing a production procedure of the upper mold and the lower mold in FIG. 1.

A manufacturing procedure of the upper mold 11 and the lower mold 12 of the mold 10 used in the above-described manufacturing process of the optical lens will be described next with reference to FIG. 4.

The upper mold 11 and the lower mold 12 are obtained by processing both surfaces of pressed thick glass blanks, and therefore, the glass blanks are prepared first (S11).

By processing each of the glass blanks, a surface imperfection layer on a press surface of the glass blank is removed, and the use surface 16 and the nonuse surface 17 are made to have radiuses of curvature with predetermined precision and at the same time, the use surface 16 and the nonuse surface 17 with microscopic and uniform roughness with high precision are obtained. The above-described work of the glass blanks is carried out by grinding and polishing.

In a grinding process, more specifically, a diamond wheel is used in a free curved surface grinding machine which performs an NC control, and both surfaces of the glass blanks (use surface 16 and the nonuse surface 17) are ground to predetermined radiuses of curvature (S12). By the grinding process, the upper mold 11 and the lower mold 12 are formed from the glass blanks.

In a polishing process, a polishing plate made by attaching polyurethane or felt onto a hollow plate of rubber is used, and with fine particle of cerium oxide/zirconium oxide or the like as an abrasive, both surfaces of the upper mold 11 an the lower mold 12 formed by grinding are polished (S13). By the polishing process, asperities on the surfaces in the use surfaces 16 and the non use surfaces 17 of the upper mold 11 and the lower mold 12, which occur in the grinding process, are removed to achieve transparency (graining removal). Then, the use surfaces 16 and the nonuse surfaces 17 are effectively finished to have sufficient surface precision.

After the polishing process, the upper mold 11 and the lower mold 12 are inspected (S14), and a hidden mark which is a reference position of a layout pattern is marked on each of the use surfaces 16 (S15). The layout pattern indicates an optical layout of the optical lens, and is used when a circular optical lens is framed into a spectacle glass frame. The layout pattern is erasably marked on the surface of the optical lens.

After marking the hidden mark, scientific glass reinforcement treatment is carried out for the upper mold 11 and the lower mold 12 (S16), and the upper mold 11 and the lower mold 12 are completed (S17). The upper mold 11 and the lower mold 12 are produced in accordance with the refractive power of the prescription of the optical lens, and therefore, many kinds of the upper molds 11 and the lower molds 12 as well as the gaskets 13 are required.

(Description of Method for Designing Mold)

A designing procedure of the upper mold 11 and the lower mold 12 in the mold 10, which are produced as described above, will be described next with reference to FIG. 5 and FIG. 7.

First, the mold 10 with which the optical lens being a molded product is molded by tests is prepared. The above-described optical lens to be molded is a spherical lens of which curved surface is a spherical curved surface. Accordingly, the use surfaces 16 which are the molding surfaces in the upper mold 11 and the lower mold 12 of the mold 10 are also formed into spherical shapes. In this case, a radius of curvature of the use surface 16 of each of the upper mold 11 and the lower mold 12 is formed to be equal to a set value of the curved surface of the optical lens (for example, a design radius of curvature $R_0$ at the vertex as a radius of curvature at the vertex power of the lens). Note that the curved surface of the optical lens having the design radius of curvature $R_0$ at the vertex is called a design curved surface 20 (FIG. 5).

Next, a molding test is carried out by using the mold 10 including the above-described upper mold 11 and the lower mold 12, a monomer is injected into the mold 10 and is heat-polymerized, and thereby, the optical lens which is a test molded product is molded. The curved surface shape of the optical lens molded by tests is not formed into a spherical shape due to thermal shrinkage of the monomer, and the like. The inventor of the present invention has found out that the major constituent of an error due to shape change after molding can be approximated by the equation of the aspherical surface expressed by the following expression (1) as a result of the earnest study. Namely, the curved surface shape of the optical lens formed by tests is molded into the shape other than a spherical shape, which includes an aspherical shape. Thus, the curved surface shape of the surface of the optical lens thus molded is measured by using the shape measuring machine with a later-described transfer marking 32 (FIG. 9) as a reference (S21 in FIG. 7). Then, the measured value is approximated by the equation of the aspherical surface by using the least square method, and the curved surface of the optical lens molded by tests is quantified and specified as an aspherical surface.

The above-described equation of the aspherical surface is the following equation (1) expressing the aspherical shape of rotational symmetry, where Z is a distance measured from a vertex O in the direction of an optical axis P, $\rho$ satisfies $\rho^2 = X^2 + Y^2$ when X and Y are distances measured from the above-described vertex O in a direction perpendicular to the above-described optical axis P, a vertex curvature C satisfies C=1/R when R is the radius of curvature at the vertex, K is a conic coefficient, and $A_{2i}$ is an aspherical coefficient (i is an integer). The equation (1) is also called the equation of Spencer.

[Mathematical Expression 4]

$$Z = \frac{C\rho^2}{1 + \sqrt{1 - (1+K)C^2\rho^2}} + \sum_{i=2}^{n} A_{2i}\rho^{2i} \quad (1)$$

However, in reality, in order to facilitate the calculation, by using the following equation (2) which is the result of transforming the above-described equation (1), the above-described measured value is approximated by the equation (2) by using the least square method, and quantified and specified, and a coefficient $B_{2i}$ (coefficient including the vertex curvature C and the aspherical coefficient $A_{2i}$ of the equation (1)) of the equation (2) is calculated. Here, i of the coefficient $B_{2i}$ is an integer.

[Mathematical Expression 5]

$$Z = \sum_{i=1}^{n} B_{2i}\rho^{2i} \quad (2)$$

Transformation from the equation (1) to the equation (2) is performed as follows. Namely, when the first term of the equation (1) is rationalized with Q=1+K (K is a conic coefficient),

[Mathematical Expression 6]

$$\text{FIRST TERM OF THE EQUATION (1)} = \frac{1 - \sqrt{1 - QC^2\rho^2}}{QC} \quad (a)$$

When the part of the square root is series-expanded,

[Mathematical Expression 7]

$$\sqrt{1 - QC^2\rho^2} = 1 - \frac{QC^2\rho^2}{2} - \frac{Q^2C^4\rho^4}{8} - \frac{Q^3C^6\rho^6}{16} - \frac{5Q^4C^8\rho^8}{128} - \frac{7Q^5C^{10}\rho^{10}}{256} - \ldots$$

When this is substituted into the equation (a),

[Mathematical Expression 8]

$$\text{FIRST TERM OF THE EQUATION (1)} = \frac{C\rho^2}{2} + \frac{QC^3\rho^4}{8} + \frac{Q^2C^5\rho^6}{16} + \frac{5Q^3C^7\rho^8}{128} + \frac{7Q^4C^9\rho^{10}}{256} + \ldots$$

When this is substituted into the equation (1) and is arranged as the polynomial equation of $\rho$, the above-described equation (1) can be expressed by the following equation (2).

[Mathematical Expression 9]

$$Z = \left(\frac{C}{2}\right)\rho^2 + \left(\frac{QC^3}{8} + A_4\right)\rho^4 + \left(\frac{Q^2C^5}{16} + A_6\right)\rho^6 + \left(\frac{5Q^3C^7}{128} + A_8\right)\rho^8 + \ldots$$

$$= \sum_{i=1}^{n} B_{2i}\rho^{2i} \quad (2)$$

Note that

[Mathematical Expression 10]

$$B_2 = \left(\frac{C}{2}\right), \quad B_4 = \left(\frac{QC^3}{8} + A_4\right), \quad (b)$$

$$B_6 = \left(\frac{Q^2C^5}{16} + A_6\right), \quad B_8 = \left(\frac{5Q^3C^7}{128} + A_8\right), \ldots$$

As described above, from the coefficient $B_{2i}$ which is calculated by approximating the measured value of the curved surface shape of the optical lens molded by tests by the equation (2), the vertex curvature C and the aspherical coefficient $A_{2i}$ of the equation (1) are calculated by using the above-described equation (b). Thereby, the curved surface shape of the optical lens molded by tests is quantified by the equation (1) and specified. However, the measurement value of the curved surface shape of the optical lens molded by tests may be directly approximated by the equation (1) and quantified to be specified, and the vertex curvature C and the aspherical coefficient $A_{2i}$ of the equation (1) may be obtained. In any case, on quantification by the equation (1), the conic coefficient K is set at K=0 (namely, Q=1), and the vertex curvature C is calculated with the first term of the equation (1) used as the equation which expresses the spherical surface, then the aspherical coefficients $A_4$, $A_6$, $A_8$ and $A_{10}$ are calculated with i=2, 3, 4 and 5.

The curved surface shape of the optical lens molded by tests, which is specified by the equation (1) is shown as a molded curved surface 21 in FIG. 5. The molded curved surface 21 is in the aspherical shape. Reference numeral 22 in FIG. 5 shows a curved surface shape of a reference spherical component which is the first term (K=0) of the equation (1) of the molded curved surface 21 of the optical lens, which is quantified and specified by the equation (1). The curved surface shape 22 shows the spherical surface (reference spherical surface) with the radius of curvature R at the vertex (R=1/C) which is the inverse number of the vertex curvature C of the equation (1) as the radius of curvature.

Further, ZN in FIG. 5 represents a component other than the spherical shape of the molded curved surface 21 of the optical lens quantified and specified by the equation (1), and shows the polynomial component that is the second term of the equation (1). The above-described polynomial component represented by the ZN is an error component with respect to the reference spherical component of the first term of the equation (1) as expressed by reference numeral 23 in FIG. 6.

Next, data of the optical lens which is molded by tests and quantified and specified by the equation (1) is analyzed (S22 in FIG. 7). In this data analysis, the vertex curvature C (radius of curvature R at the vertex) of the equation (1) and the aspherical coefficients $A_4$, $A_6$, $A_8$ and $A_{10}$ are used. For example, when the design radius of curvature $R_0$ at the vertex of the design curved surface 20 of the optical lens is set at $R_0$=532.680 mm, the radius of curvature R at the vertex (=1/C) of the molded curved surface 21 of the optical lens which is molded from the mold 10 having the upper mold 11 and the lower mold 12 each with the use surface 16 formed to be the above-described design curved surface 20, and is quantified and specified by the equation (1) is set at R=489.001 mm, and the aspherical coefficients $A_4$, $A_6$, $A_8$ and $A_{10}$ are set as shown in Table 1. The radius of curvature R at the vertex and the aspherical coefficients $A_4$, $A_6$, $A_8$ and $A_{10}$ are used in the data analysis.

TABLE 1

| i | ASPHERICAL COEFFICIENT | ASPHERICAL COEFFICIENT VALUE |
|---|---|---|
| 2 | $A_4$ | $1.35749160310267 \times 10^{-7}$ |
| 3 | $A_6$ | $-5.09568302053733 \times 10^{-11}$ |
| 4 | $A_8$ | $-3.82812002603438 \times 10^{-15}$ |
| 5 | $A_{10}$ | $3.9996422621367 \times 10^{-18}$ |

(Mold Designing Method: Separation of Spherical and Aspherical Components of Error)

In this data analysis, the reference spherical component which is the first term of the equation (1) by which the optical lens molded by tests is quantified and specified, and the polynomial component which is the second term of the equation (1) are dealt separately and independently.

Incidentally, in the prior art, the spherical component and the aspherical component of a shape error are integrally corrected. Accordingly, as for the correction coefficient of the shape error, the same coefficient is applied to the spherical component and the aspherical component. However, the correction numeric value of each lens shape which will be described later totally differs for each shape in the spherical component and the aspherical component of a shape error. For example, FIG. 12(b) shows a correction numeric value in the concave surface side of the spherical component of the shape error. FIG. 12(b) shows that even if the surface shape of the lens changes, the spherical component correction value on the concave surface side is constant except for some shapes. Further, FIG. 12(a) shows the correction numeric value on the convex surface side of the spherical component of the shape error. The correction numeric value shown in FIG. 12(a) indicates that the shape of the convex side becomes constant at the refractive power of 4D or more. Namely, as for the entire shape correction value, the correction numeric values of the shape errors are constant on both concave and convex surfaces at the refractive power of 4D or more. Namely, as for the entire shape correction value, the correction numeric values of the shape errors are constant on both the concave and convex surfaces at the refractive power of 4D or more. On the other hand, the aspherical component of the shape error shows a different value at each refractive power, and there is no tendency in the shape error and the correction value, and the shape of the molded product.

However, in the prior art, the spherical component and the aspherical component of a shape error are integrally corrected. Accordingly, the correction values are changed in all the shapes. However, correction is made by changing the correction values for the shape error spherical components of the lens shape at the refractive power of 4D or more for which the correction value does not have to be changed originally, and therefore, determination of the correction values is further complicated. As a result, suitable correction values are determined by sufficiently repeating trial manufacture for each of all the molds. In this embodiment, the spherical component and the aspherical component of a shape error are separated, and correction information is obtained independently, whereby proper correction is carried out and the mold can be easily designed.

Namely, information, which corresponds to an error of the spherical component among errors between the molded curved surface 21 (FIG. 5) of the optical lens molded by tests and quantified and specified by the equation (1) and the design curved surface 20 of the optical lens, is calculated by using the reference spherical component (shape expressed by the curved surface shape 22 in FIG. 5) that is the first term (K=0) of the equation (1). The information is set as entire shape correction information (S23 in FIG. 7). The entire shape correction information is for correcting the entire surface shape of the use surfaces 16 in the upper mold 11 and the lower mold 12 of the mold 10 and for eliminating the error of the above-described spherical shape component.

More specifically, a difference H in a Z-direction between the radius of curvature R at the vertex of the curved shape 22 (reference spherical surface) expressed by the reference spherical component that is the first term (K=0) of the equation (1) which quantifies and specifies the molded optical lens, and the design radius of curvature $R_0$ at the vertex in the design curved surface 20 of the optical lens is calculated as an error of the spherical shape component in the molded curved surface 21 of the molded optical lens. The difference H is determined as the entire shape correction information. The entire shape correction information is necessary correction information for the molded optical lens to obtain desired refractive power.

The radius of curvature R at the vertex of the curved surface shape 22 (reference spherical surface) expressed by the reference spherical component that is the first term (K=0) of the equation (1) which quantifies and specifies the molded optical lens, and the design radius of curvature $R_0$ at the vertex in the design curved surface 20 of the optical lens sometimes do not correspond with each other due to the rate of shrinkage of a raw material. The rate of shrinkage differs in each raw material. When the difference between the radius of curvature R at the vertex and the design radius of curvature $R_0$ at the vertex is 2D or less, preferably 1D or less, in surface refraction power conversion of a later-described equation (3), the molded curved surface of the molded product (optical lens) can be formed into a desired shape by using the above-described entire shape correction information and the later-described local shape correction information.

Further, information, which corresponds to an error of the components other than the spherical shape among errors between the molded curved surface 21 of the optical lens molded by tests and quantified and specified by the equation (1) and the design curved surface 20 of the optical lens, is calculated by using the polynomial component (expressed by ZN in FIG. 5) which is the second term of the equation (1). The information is set as the local shape correction information. (S24 in FIG. 7). The local shape correction information is for correcting the local shape of the use surfaces 16 in the upper mold 11 and the lower mold 12 of the mold 10, namely, partially correcting the use surfaces 16 and eliminating errors of the components other than the above-described spherical shape.

More specifically, a shape change rate is calculated by using a height (Z value) ZN of the component other than the spherical shape in the molded curved surface 21 (FIG. 5) of the optical lens, which is expressed by the polynomial component that is the second term of the equation (1) quantifying and specifying the molded optical lens, and a height (Z value) ZM in the design curved surface 20 of the optical lens. The shape change rate is calculated with the shape change rate=ZN/ZM, and is calculated at each position from the vertex of the optical lens molded by tests. The local shape correction information is calculated and determined in each position from the vertex of the optical lens molded by tests as the value obtained by multiplying the shape change rate in the position by the height ZM of the design curved surface 20 of the optical lens at the position.

Here, the above-described height ZN is expressed by the difference of the respective heights (Z values) at the same position from the vertex of the optical lens in the curved surface shape 22 (reference spherical surface) expressed by the reference spherical component of the first term (K=0) of the equation (1) and the molded curved surface 21 of the optical lens molded and specified by the equation (1).

Finally, the use surfaces 16 of the upper mold 11 and the lower mold 12 in the mold 10 are corrected and designed by using the local shape correction information and the entire shape correction information calculated as described above (S25 in FIG. 7).

Namely, the local shape correction information corresponding to each position is first added in the Z-direction to the design value of each position from the vertex of the lens in the use surfaces 16 of the upper mold 11 and the lower mold 12 formed to be the design curved surface 20 of the optical lens. Thereby, the errors of the components other than the spherical shape in the molded curved surface 21 of the optical lens to be molded are eliminated. Next, the entire shape correction information (difference H) is added in the Z-direction to the design values of the entire surfaces in the use surfaces 16 of the upper mold 11 and the lower mold 12 to which the local shape correction information is added. Thereby, the errors of the spherical components in the molded curved surface 21 of the optical lens to be molded are eliminated. In this manner, the design values of the use surfaces 16 of the upper mold 11 and the lower mold 12 are corrected, and the use surfaces 16 are designed.

Addition of the above-described entire shape correction information may be carried out only for the design value of the use surface 16 of the lower mold 12. The reason is that the lower mold 12 is common in various kinds of optical lenses, and has less the number of use surfaces 16 to be corrected than the upper mold 11 does. Besides, the reason is that the influence is considered to uniformly act on the curved surface (convex surface) of the optical lens by changing the radius of curvature of the curved surface (concave surface) of the optical lens molded by the use surface 16 of the lower mold 12.

Figure 8:
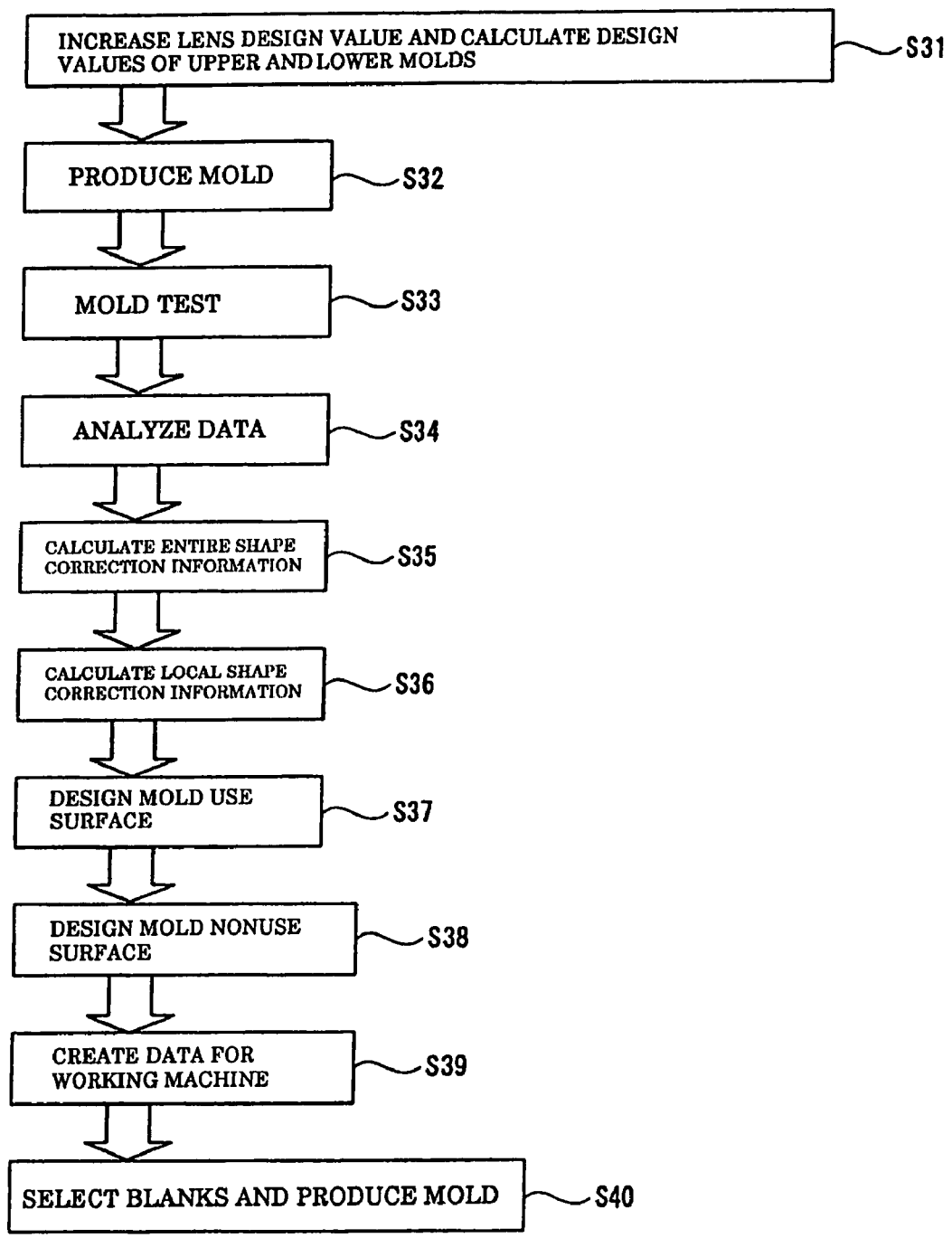
FIG. 8 is a flowchart concretely showing a design procedure of the upper mold and the lower mold in FIG. 1.

A design procedure for correcting and designing the use surfaces 16 of the upper mold 11 and the lower mold 12 as described above will be further described with reference to FIG. 8.

The use surfaces 16 of the upper mold 11 and the lower mold 12 have to be larger than the size of the optical lens to be molded, and therefore, the design values of the use surfaces 16 are calculated by increasing the design values of the curved surfaces of the optical lens (S31). Based on the calculated design values, the upper mold 11 and the lower mold 12 are produced so that the use surfaces 16 become equal to the design curved surfaces of the optical lens (design radius of curvature $R_0$ at the vertex), and the mold 10 is assembled (S32).

Next, a monomer is injected into the assembled mold 10, the optical lens is molded by tests, and the curved surface shape of the optical lens being the molded product is measured by using a shape measuring device with a later-described transfer marking 32 (FIG. 9) as a reference (S33). As the shape measuring device, for example, Form Talysurf made by Taylor Hobson Ltd. is mainly used in this embodiment, but a non-contact type three-dimensional measuring device (for example, UA3P made by Matsushita Electric Industrial Co., Ltd., and the like) and the like can be used, and the measuring device is not especially limited. In Form Talysurf, ruby or diamond is set at a tip end of a probe, the tip end of the probe moves on the surface of a lens in contact with the surface and scans the lens surface to measure the surface shape, and its measuring locus is usually only a straight line. Meanwhile, the three-dimensional measuring device is a type of floating from a measured surface by an intermolecular force by a very small constant amount.

Next, the above-described measurement value of the optical lens molded by tests is approximated by using the least square method in the equation (2), then the curved surface shape of the molded optical lens is quantified and specified, and the coefficient $B_{2i}$ is calculated. Further, from the coefficient $B_{2i}$, by using the equation (b), the vertex curvature C of the equation (1) (K=0) and the aspheric coefficients $A_4$, $A_6$, $A_8$ and $A_{10}$ are calculated, and the curved surface shape of the molded optical lens is quantified and specified by the equation (1) (K=0).

Thereafter, by using the above-described vertex curvature C and aspherical coefficients $A_4$, $A_6$, $A_8$ and $A_{10}$, data of the optical lens molded and quantified by the equation (1) is analyzed (S34). In this case, the first term (K=0) and the second term of the equation (1) are treated separately and independently, the entire shape correction information is calculated from the first term (K=0) (S35), and the local shape correction information is calculated from the second term. (S36).

Next, the calculated local shape correction information and entire shape correction information are added to the design values of the respective use surfaces 16 of the upper mold 11 and the lower mold 12 which are formed to be the design curved surface (design radius of curvature $R_0$ at the vertex) of the optical lens, and the use surfaces 16 are corrected and designed (S37).

Next, design of the nonuse surfaces 17 of the upper mold 11 and the lower mold 12 is carried out (S38). Then, data for processing machine is created from the design values of the use surfaces 16 and the nonuse surfaces 17 in the upper mold 11 and the lower mold 12 (S39). Thereafter, glass blanks are selected, and the upper mold 11 and the lower mold 12 of the mold 10 are produced by a grinding machine and a polishing machine (S40).

(Comparison of Molded Product Precision of Embodiment and Prior Art)

The shape precision of the molded product according to this embodiment will be described.

Figure 10:
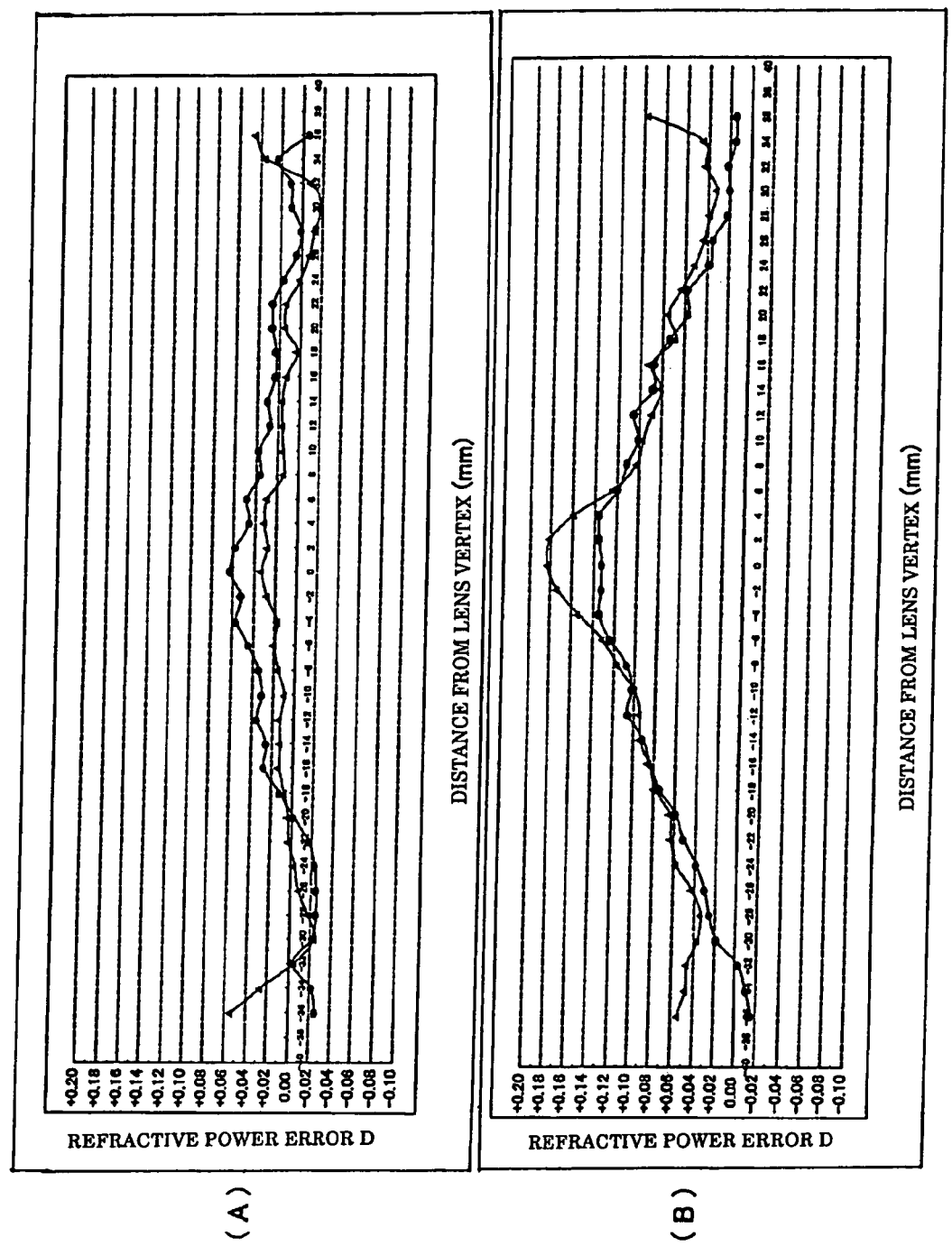
FIG. 10 shows a shape error which the molded curved surface of the optical lens that is the molded product has with respect to the design curved surface at each position of the optical lens.

The optical lens molded by the mold 10 having the upper mold 11 and the lower mold 12 which are produced as described above has the curved surfaces in desired spherical shapes. For example, FIG. 10(A) is a shape error measurement result when the curved surface of the molded product according to this embodiment is measured in the different diameter directions (two orthogonal directions to each other in the drawing). FIG. 10(B) is a shape error measurement result when the curved surface of the molded product according to the above-described first prior art is measured in the different diameter directions (two orthogonal directions to each other in the drawing). FIG. 10A and FIG. 10B are the measurement results of the molded products which are optical lenses with the surface refraction power of 5.00 D (diopter) molded by the mold 10. In FIG. 10, the horizontal axis represents a distance (mm) from a lens center (vertex), and 0 at the central part of the graph represents an optical lens center. The vertical axis represents a refractive power error amount, and 0.00 D indicates no error. Based on FIG. 10, shape error amounts of the molded products molded according to this embodiment and the first prior art will be described in detail.

A lens central part will be explained first. The lens central part is frequently used and is especially important as the optical center. The error amounts at the optical lens central parts obviously differ, and the error amount is 0.06 D in this embodiment (FIG. 10(A)) while in the first prior art (FIG. 10(B)), the error amount is 0.18 D. Accordingly, it is understood that the precision is enhanced by three times in this embodiment as compared with the above-described prior art.

Further, a peripheral part other than the lens central part will be explained. In this peripheral part, the shape error with respect to the design curved surface of the optical lens when the curved surface of the molded optical lens is measured in the different diameter directions (two directions orthogonal to each other in the drawing) is small in the molded product according to this embodiment in any position of each part of the lens. When comparing the shape errors in the vicinity of the outer diameter of 50 mm of the spectacle lens used in a general spectacle frame, the error amount is about 0.02 D in this embodiment, while in the first prior art, the error amount is 0.04 D. Accordingly, it is found out that precision in this embodiment is enhanced about twice as high as the one in the above-described prior art.

Further, as for the error amount of this embodiment, the change amount of the error is small and gentle from the lens central part to the peripheral part as compared with the first prior art. Therefore, there is the effect of having less incompatibility even if the visual line position moves from the central part to the peripheral part by rotation of an eye.

From these results, it is found out that the optical lens molded in the mold 10 according to the designing method of this embodiment is in the substantially equal shape to the design curved surface. Besides, it is determined that the optical lens molded by the mold in the first prior art is in the shape different from the design curved surface.

Here, each of the vertical axes in FIGS. 10(A) and 10(B) represents the refractive power error (unit: D (diopter)). The refractive power error is the error of the radius of curvature r (unit: m) indicating the curved shape of the optical lens, which is converted into the error of the surface refractive power P (unit: D (diopter)) of the above-described curved surface of the optical lens by the following equation (3).

$$P=(n-1)/r \quad (3)$$

In this equation (3), n represents a refractive index of the optical lens. Note that in the optical lens in the meniscus shape having the convex surface and the concave surface, the sum of the surface refractive powers of the convex surface and the concave surface expresses the refractive power of the optical lens.

(Explanation of Surface Shape Measurement)

Next, the transfer mark 32 (FIG. 9(A)) set as a reference when the curved shape of the optical lens molded by tests in step 21 in FIG. 7 and step 33 in FIG. 8 will be described. The transfer mark 32 is formed by transferring markings (not shown) formed on the use surfaces 16 of the upper mold 11 and the lower mold 12 of the mold onto the curved surface 31 of the optical lens 30 which is molded by tests.

Further, as is understood from the FIGS. 9(B) and 9(C), the transfer mark 32 has a vertex transfer mark part 33 which is formed on the portion of the vertex O in the curved surface 31 of the optical lens 30, and a pair of peripheral edge part transfer mark parts 34A and 34B formed at positions which are on the peripheral edge part of the above-described curved surface 31 and symmetrical with respect to the above-described vertex O. Further, the above-described vertex transfer mark part 33 has a main vertex transfer mark part 35 which is formed at the vertex O of the curved surface 31, and sub vertex transfer mark parts 36 which radiate out at predetermined distances from the main vertex transfer mark part 35 and are formed to be orthogonal to each other.

For example, the main vertex transfer mark part 35 is a circular convex part with the diameter of about 0.5 mm. Further, the peripheral edge part transfer mark parts 34A and 34B are circular convex parts each with a diameter of about 1 mm. Further, the sub vertex transfer mark part 36 is a rectangular convex part with the length S of about 2 mm, a spaced distance T between the sub vertex transfer mark parts 36 on the same straight line of about 1 mm, and width dimension of the sub vertex transfer mark part 36 of several tens μm.

On each of the use surfaces 16 of the upper mold 11 and the lower mold 12, markings (not shown) in concave shapes in the corresponding sizes are formed at the positions corresponding to the above-described main vertex transfer mark part 35, the sub vertex transfer mark parts 36, and the peripheral edge part transfer mark parts 34A and 34B. Thereby, the above-described vertex transfer mark 33 (the main vertex transfer mark part 35, the sub vertex transfer mark parts 36), the peripheral part transfer mark parts 34A and 34B are transferred and formed on the curved surface 31 of the optical lens 30. The markings for transferring the peripheral part transfer mark parts 34A and 34B are cut to be about 1 mm in diameter and several μm in depth. The marking for transferring the main vertex transfer mark part 35 is cut to be about 0.5 mm in diameter and about 0.5 μm or less in depth. The marking for transferring the sub vertex transfer mark part 36 is formed by being scribed to be several tens μm in width and several μm or less in depth.

The vertex transfer mark part 33 (especially the main vertex transfer mark part 35), and the peripheral edge part transfer mark parts 34A and 34B, which are transferred to be formed on the curved surface 31 of the optical lens 30, are on the same straight line L1 passing the vertex O of the curved surface 31. The shape measuring device which measures the shape of the curved surface 31 of the optical lens 30 measures the shape of the above-described curved surface 31 by sequentially passing the peripheral part transfer mark part 34A, the vertex transfer mark part 33 and the peripheral part transfer mark part 34B along the above-described straight line L1, and thereby the shape measuring device is capable of accurately measuring the shape of the curved surface 31. Accordingly, the vertex transfer mark part 33 (especially, the main vertex transfer mark part 35), and the peripheral edge part transfer mark parts 34A and 34B are located at the spot where the curved surface 31 of the optical lens 30 should be measured.

When the shape measuring device measures the curved surface 31 of the optical lens 30 by sequentially passing the peripheral edge part transfer mark part 34A, the vertex transfer mark part 33 and the peripheral edge part transfer mark part 34B along the straight line L1, the vertex transfer mark part 33, the peripheral edge part transfer mark parts 34A and 34B have an extreme shape change, and therefore, it is measured as a large noise. Therefore, when the noise of the vertex transfer mark part 33, the peripheral edge part transfer mark parts 34A and 34B is not measured, it is obvious that the shape measurement in the curved surface 31 of the optical lens 30 by the shape measuring device is not accurately conducted. In this case, setting of the optical lens 30 with respect to the shape measuring device is adjusted, so that the shape measuring device performs measurement by sequentially passing the peripheral edge part transfer mark part 34A, the vertex transfer mark part 33 and the peripheral edge part transfer mark part 34B.

Note that the large noise in the above-described measured value caused by the vertex transfer mark part 33, and the peripheral edge part transfer mark parts 34A and 34B can be easily excluded without having an influence on the measured values nearby. Thereafter, the above-described measured value is approximated by the equation (1) of the aspherical surface or the equation (2) by using the least square method as described above, and therefore, no influence is on the measured value. As for the measurement error of the vertex transfer mark part 33, and the peripheral edge part transfer mark parts 34A and 34B, the measurement error for the peripheral edge part transfer mark parts 34A and 34B is within about 0.5 mm because the peripheral edge part transfer mark parts 34A and 34B are each in a circular shape of about 1 mm in diameter. The measurement error for the main vertex transfer mark part 35 is within about 0.25 mm because the main vertex transfer mark part 35 of the vertex transfer mark part 33 is in a circular shape of about 0.5 mm in diameter.

The present invention is not limited to the case where a set of peripheral edge transfer mark parts 34A and 34B are provided to be symmetric with respect to the vertex O in the curved surface 31 of the optical lens 30, but a plurality of peripheral edge transfer mark parts 34A and 34B may be provided. For example, another set of peripheral edge part transfer mark parts 34A and 34B may be transferred on a straight line L2, which is rotated at a predetermined angle (for example, 90 degrees) with respect to the straight line L1 including the peripheral edge part transfer mark parts 34A and 34B as well as the peripheral part transfer mark parts 34A and 34B on the straight line L1. The shape measuring device measures the curved surface 31 of the optical lens 30 in the different diameter directions along the above-described straight lines L1 and L2, and thereby, it becomes possible to accurately measure the curved surface 31 of the optical lens 30 such as a toric lens, for example, in both the orthogonal axial directions.

The transfer mark 32 is further provided in an optional direction in the curved surface 31 of the optical lens 30, and in this direction, the curved surface shape of the curved surface 31 may be measured in this direction by the shape measuring device.

(Effect of the First Embodiment)

Since the first embodiment is constructed as above, the following effects (1) to (5) are provided according to the above-described embodiment.

(1) The curved surface shape of the optical lens which is molded from the mold 10 including the upper mold 11 and the lower mold 12 is measured, and the measured value is approximated by the equation (1) that is the equation of the aspherical surface and the curved surface of the optical lens is specified as the aspherical surface. Therefore, of the curved surface shape of the molded optical lens, not only the spherical components but also the components other than the spherical components can be approximated by the equation (1) of the aspherical surface, and quantified and specified. Accordingly, the error between the curved surface of the optical lens specified to be the aspherical surface and the design curved surface of the optical lens becomes the error in which the spherical shape components and the components of the shape other than the spherical shape are accurately taken. As a result, the correction information corresponding to the above-described error becomes accurate, the upper mold 11 and the lower mold 12 can be designed by precisely correcting the use surfaces 16 of the upper mold 11 and the lower mold 12 in the mold 10.

(2) The measured value of the curved surface shape of the molded optical lens is approximated by the equation (1) which is the equation of the aspherical surface, and the curved shape of the above-described optical lens is quantified and specified as the aspherical surface. Accordingly, the measurement error included in the measured value and a noise such as surface roughness of the curved surface of the optical lens can be excluded, and only the measured value of the curved surface of the optical lens can be extracted. Therefore, the upper mold 11 and the lower mold 12 can be designed by precisely carrying out the correction of the use surfaces 16 of the upper mold 11 and the lower mold 12 in the mold 10.

(3) Based on the reference spherical component which is the first term (K=0) of the equation (1), the entire shape correction information for correcting the entire shapes of the use surfaces 16 of the upper mold 11 and the lower mold 12 in the mold 10 is obtained to cope with the error (error of the average surface refractive power) of the spherical shape component in the curved surface of the molded optical lens. Based on the polynomial component which is the second term of the above-described equation (1), the local shape correction information for correcting the local shapes of the use surfaces 16 of the above-described upper mold 11 and the lower mold 12 is obtained to cope with the error of the components other than the spherical shape in the curved surface of the molded optical lens. By obtaining the entire shape correction information and the local shape correction information separately and independently in this manner, the upper mold 11 and the lower mold 12 can be designed by precisely reflecting the errors of the optical lens (the error of the spherical shape component and the error of the components other than the spherical shape) in the correction information and carrying out suitable correction.

(4) The measured value obtained by measuring the curved shape of the molded optical lens is approximated by the equation (2) which is the equation of the aspherical surface and the curved surface of the above-described optical lens is specified. Therefore, as compared with the case where the curved surface of the optical lens is specified by using the equation (1) which is difficult to handle with a calculator, determination can be carried out by easy calculation, and the coefficient $B_{2i}$ of the equation (2) can be quickly calculated. Therefore, the correction information corresponding to the deformation (error) of the optical lens is easily calculated, and the upper mold 11 and the lower mold 12 of the mold 10 for molding the optical lens in a desired shape can be easily designed.

Figure 9:
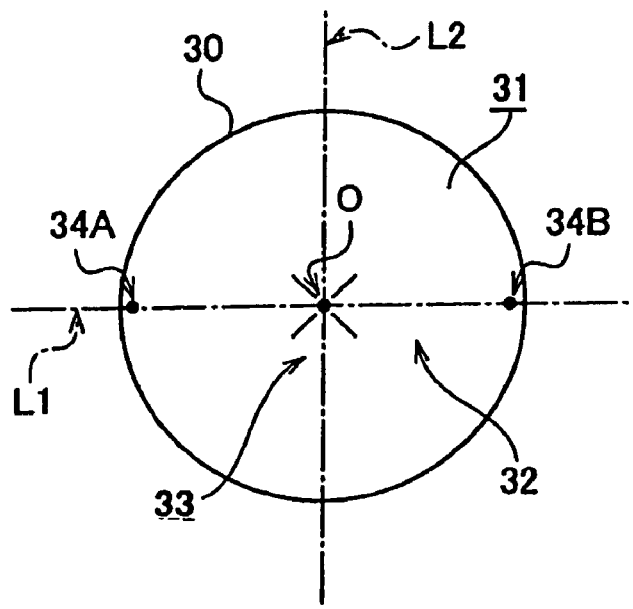
FIG. 9(A) is a front view showing a transfer marking which is transferred from the mold in FIG. 1 and formed on a curved surface of the optical lens.
FIG. 9(B) is a partially enlarged view showing a vertex transfer marking of FIG. 9(A)
FIG. 9(C) is a partially enlarged view showing a peripheral edge part transfer marking in FIG. 9(A)
Figure 9:
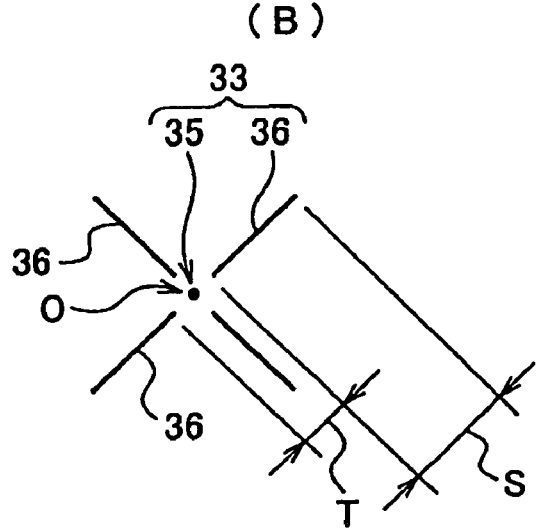
Figure 9:
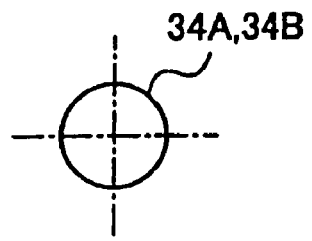

(5) The marks (not shown) provided at the use surfaces 16 in the upper mold 11 and the lower mold 12 of the mold 10 are transferred onto the curved surface 31 of the optical lens 30 shown in FIG. 9 and the transfer mark 32 (vertex transfer mark part 33, the peripheral part transfer mark parts 34A and 34B) is formed thereon. The transfer mark 32 is located at the spot which should be measured in the curved surface 31 of the optical lens 30. When the curved shape of the optical lens formed from the mold 10 is measured, the shape of the curved surface 31 of the above-described optical lens 30 is measured as the above-described transfer marking 32 located at the spot to be measured as a reference. Thereby, measurement of the curved surface shape of the optical lens 30 can be accurately carried out. As a result, the measured value is approximated by the equation (1) or the equation (2) of the aspherical surface, the curved surface of the optical lens is specified as the aspherical surface, the correction information is calculated, and thereby, the use surfaces 16 of the upper mold 11 and the lower mold 12 in the mold 10 can be precisely designed.

Figure 11:
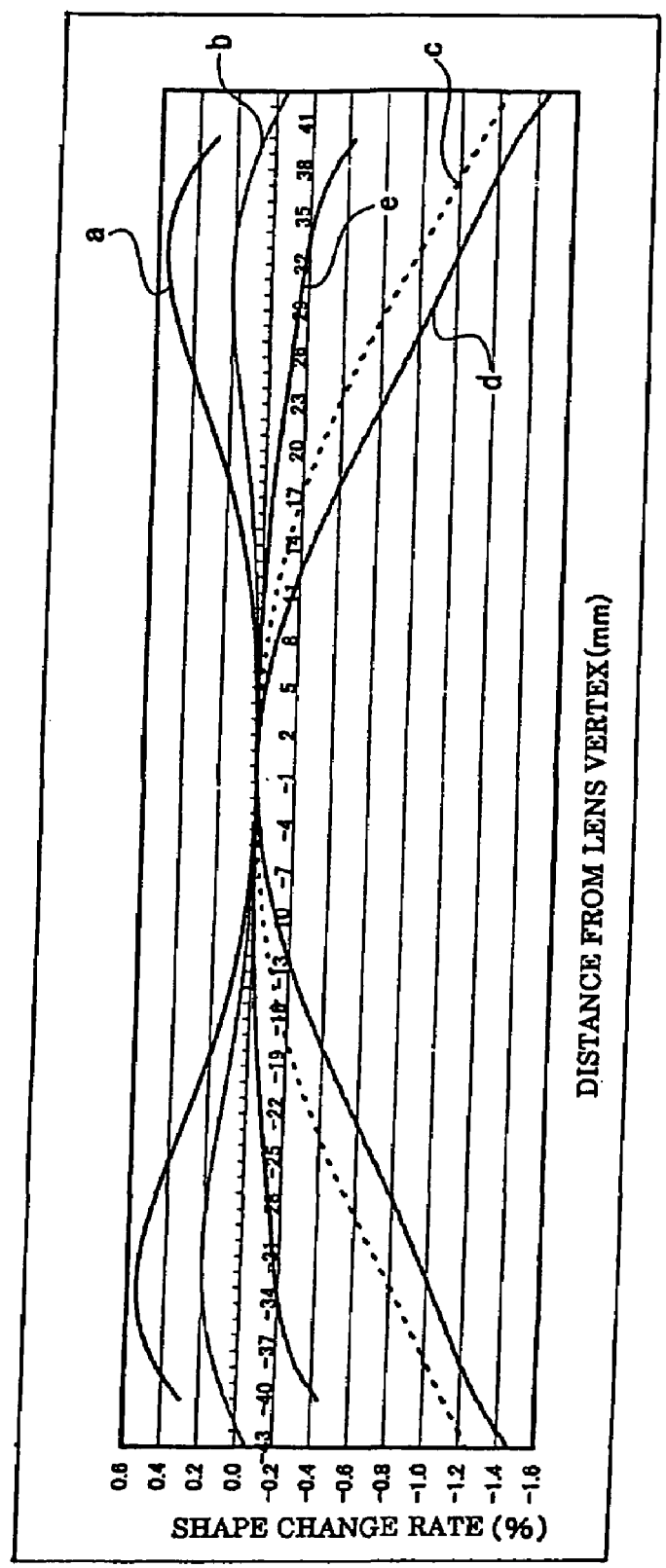
FIG. 11 is a graph showing a shape change rate that is a part of the local shape correction information compiled into database, which is used in a second embodiment in the method for designing a mold according to the present invention.
Figure 12:
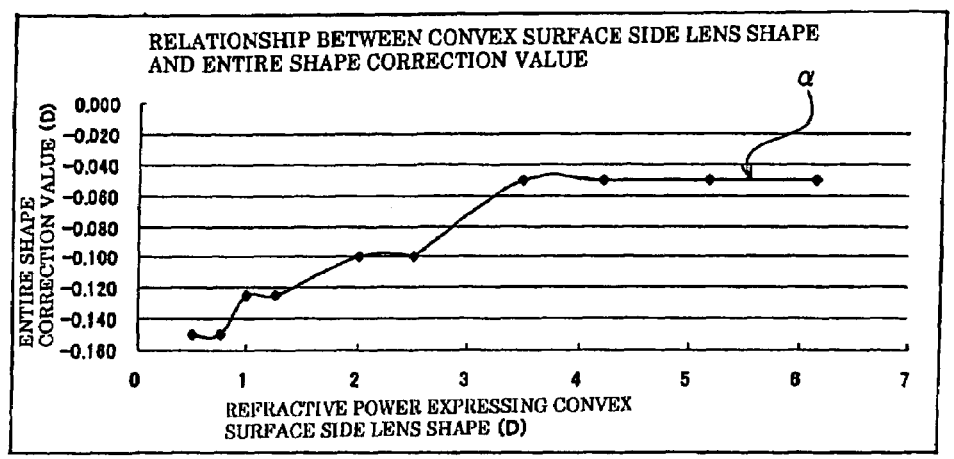
FIG. 12 is a graph showing the entire shape correction information that is compiled into database, which is used in the second embodiment in the method for designing the mold according to the present invention.
Figure 12:
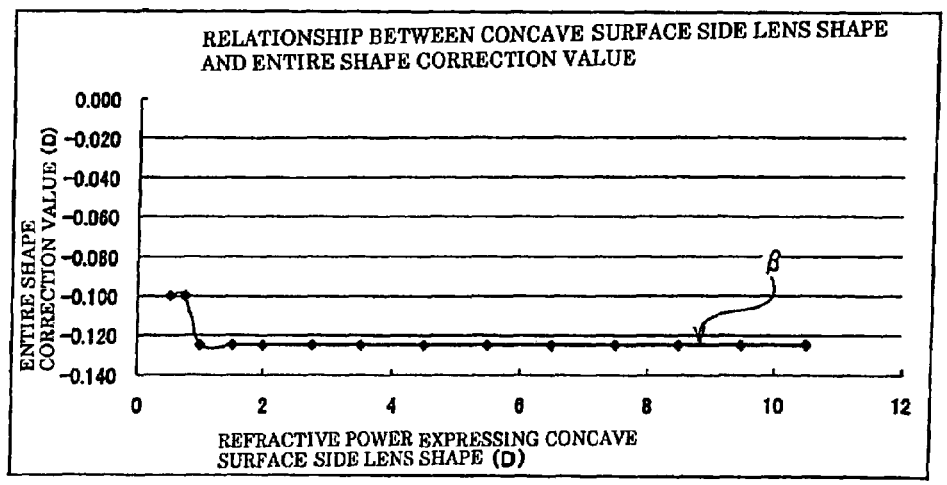

[B] Second Embodiment (FIG. 11, FIG. 12)

(Explanation of Compiling Correction Information into Database)

FIG. 11 is a graph showing a shape change rate curve which is a part of the local shape correction information compiled into database that is used in a second embodiment in the method for designing a mold according to the present invention. FIG. 12 is a graph showing the entire shape correction information which is compiled into database that is used in the second embodiment in the method for designing the mold according to the present invention. In the second embodiment, the explanation of the same parts as in the aforementioned first embodiment will be omitted by using the same reference numerals and symbols, and the names.

The second embodiment differs from the aforementioned first embodiment in the following point. In FIG. 8, steps S31 to S40 are previously carried out for all kinds of molds. On this occasion, each correction information is compiled into database. After creation of the database, steps S35 to S40 are carried out without performing steps S31 to S34.

Namely, in the first embodiment, one kind of optical lens is molded by tests concerning the lens material and the design curved surface shape of the optical lens, and the correction information (the entire shape correction information, the local shape correction information) is obtained. By directly using the correction information, the upper mold 11 and the lower mold 12 of the mold 10 are corrected and designed.

On the other hand, in the second embodiment, a number of kinds of optical lens differing in the lens material and the design curved surface shape of the optical lens as the characteristics of the optical lens are respectively molded by tests in advance, and the correction information obtained at that time is compiled into database for each characteristic of the optical lens. After creation of the database, the design values of the use surfaces 16 of the upper mold 11 and the lower mold 12 of the mold 10 for mass production of each of the optical lenses are corrected and designed by using the correction information compiled into database without another test-molding or by only simple test molding.

Namely, in the second embodiment, the use surfaces 16 of the upper molds 11 and the lower molds 12 of a large number of molds 10 with which molds respective plurality of kinds of optical lenses differing in the shape of the design curved surface are molded are designed with respect to each of a number of lens materials with different refractive indexes. The optical lenses are molded by tests by using a number of designed molds 10, and the curved surface shape is measured for each of the molded optical lenses. Then, as in the aforementioned embodiment, the above-described measured value is approximated by the equation (2) and the curved surface shape of each of the optical lenses is quantified. At this time, the vertex curvature C and the aspherical coefficient $A_{2i}$ (aspherical coefficients $A_4$, $A_6$, $A_8$, $A_{10}$) are obtained from the calculated coefficient $B_{2i}$, and the curved surface shape of each of the molded optical lenses is quantified and specified by the equation (1).

Then, as in the aforementioned embodiment, data analysis is performed with respect to each of the curved surface shape of the optical lenses which are molded and specified by the equation (1). Then, the entire shape correction information is obtained from the first term (K=0) of the equation (1) of each of them, and the shape change rate curve which is a part of the local shape correction information is obtained from the second term of the equation (1) of each of them.

FIG. 11 shows the shape change rate curve of each molded optical lens in each position from the lens vertex in the optical lens when a plurality of optical lenses differing in the shape of the design curved surface are molded. In this case, the refractive index of the lens material of the optical lens is 1.699. In FIG. 11, the horizontal axis represents a distance (mm) from the lens center, and 0 at the central portion of the graph represents the optical lens center. The vertical axis in FIG. 11 represents the shape change rate, and 0% indicates no shape change and no need of correction.

As shown as an example in FIG. 11, the shape change rate curve of the molded optical lens is calculated for each lens material differing in refractive index and each shape of the design curved surfaces of the optical lenses, and is compiled into database. Reference symbols a, b, c, d and e in FIG. 11 represent the shape change rate curves when the shapes (radiuses of curvature) of the design curved surfaces of the optical lenses are respectively the shape corresponding to +2.00 D, the shape corresponding to 0.00 D, the shape corresponding to −2.00 D, the shape corresponding to −6.00 D, and the shape corresponding to −10.00 D.

In FIG. 12, the horizontal axis represents the surface refractive power (D) expressing the lens shape, and numeric value 1 on the horizontal axis represents the lens shape with a large radius of curvature and a small curve value, while numeral value 6 on the horizontal axis represents the lens shape with a small radius of curvature and a large curve value. The vertical axis represents the entire shape correction value, and 0 D indicates no shape change and no need of correction.

FIG. 12 shows relationships of the entire shape correction information of molded optical lenses and the design curved surfaces of the optical lenses by the curve α on the convex surface side and by a curve β on the concave surface side respectively when a plurality of optical lenses differing in the shape of the design curved surface of the optical lens are molded. In this case, the optical lens has the lens material of a refractive index of 1.699, and is a spectacle glass lens in the meniscus shape having the convex surface and the concave surface. As shown as an example in FIG. 12, the entire shape correction information of the molded optical lens is calculated for each lens material differing in refractive index, and for each shape of the design curved surface of the optical lens, and is compiled into database.

Note that in FIG. 11 and FIG. 12, the shapes (radius of curvatures) of the design curved surfaces of the optical lenses are shown by being converted into surface refractive power (unit: D (diopter)) by using the aforementioned equation (3).

The case of producing the optical lenses in volume with different lens materials and different shapes of the design curved surfaces will be described. First, among the shape change rate curves of the optical lenses compiled into database as described above, the shape change rate curve concerning the optical lens with the same lens material (the same refractive index) and the same design curved surface shape as the optical lens to be produced in volume is extracted. Then, the value of an optional position from the lens vertex of the shape change rate curve is multiplied by the height (Z value) of the design curved surface of the optical lens in the corresponding position to calculate the local shape correction information in the position. The local shape correction information is calculated in all the positions of the optical lens.

More specifically, when the refractive index is 1.669, and the curved surface shape corresponds to −6.00 D, the shape change curve d in FIG. 11 is selected. Then, by multiplying the corresponding lens design surface height (Z value), the local correction information is determined in all the positions in the optical lens. Similarly, when the curved surface shape corresponds to −10.00 D, the shape change rate curve e in FIG. 11 is selected.

Incidentally, FIG. 11 shows that if the curved surface shape changes even with the same lens material, the shape change rate curve changes dynamically. Further, the curved surface shape value −2.00 D (curve c in FIG. 11) is smaller in shape change rate than the curved surface shape value −6.00 D (curve d in FIG. 11), and the shape change rate and the curve value of the curvature shape are proportional to each other. However, the curved surface shape value −10.00 D (curve e in FIG. 11) is smaller in shape change rate than the curved surface shape value −2.00 D (curve c in FIG. 11), and they are inversely proportional to each other. Accordingly, it is determined that the shape change of the complicated shape as a lens expresses a complicated form and it is difficult to perform proper correction with the prior art.

Next, the entire shape correction information concerning the optical lens of the same lens material (the same refractive index) and the same design curved shape as the optical lens to be produced in volume is extracted from the entire shape correction information of the optical lens which is compiled into database.

Incidentally, FIG. 12 shows that when the curved shape changes even with the same lens material, the entire shape correction value also changes irregularly. For example, in the convex surface, the entire shape correction value is proportional to the surface refractive power at the surface refractive power of 0 to 3 D. On the other hand, when the surface refractive power becomes larger than 4 D, the entire shape correction value becomes constant at −0.05 D. Further, on the concave surface side, the entire shape correction value is constant except at some surface refractive powers. Accordingly, it turns out that the shape change of the complicated shape as a lens is unpredictable at present and it is difficult to perform suitable correction with the prior art.

The use surfaces 16 in the upper mold 11 and the lower mold 12 of the mold 10 are designed to be the design curved surfaces of the optical lens to be produced in volume. When the optical lens is produced in volume, the local shape correction information calculated based on the shape change rate curve extracted from the database as described above and the entire shape correction information which is extracted from the database are added respectively to the design values of the above-described use surfaces 16 in the Z-direction. Thereby, the design values of the use surfaces 16 in the upper mold 11 and the lower mold 12 of the mold 10 for molding the optical lens to be produced in volume are corrected and calculated, and the upper mold 11 and the lower mold 12 of the mold 10 are designed.

(Effect of the Second Embodiment)

As constructed as above, the above-described second embodiment also provides the following effect (6) other than the same effects as the effects (1) to (5) in the aforementioned first embodiment.

(6) The entire shape correction information and the shape change rate curve which is a part of the local shape correction information are made to separate and be independent, and are compiled into database for each lens material and each shape of the design curved surface of the optical lens, and by using each correction information compiled into database and the like, the design values of the use surfaces 16 in the upper mold 11 and the lower mold 12 of the mold 10 are corrected and designed. As a result of this, by taking out the entire shape correction information and the local shape correction information (to be accurate, the shape change rate curve which is a part of the local shape correction information) which are suitable for the lens material and the shape of the design curved surface of the optical lens from the database, correction information and the like of the design values of the use surfaces 16 in the upper mold 11 and the lower mold 12 of the mold 10 can be determined in a short time without carrying out test molding. As a result, the use surfaces 16 in the upper mold 11 and the lower mold 12 of the mold 10 can be efficiently designed.

[C] Third Embodiment (Explanation of Aspherical Shape Correcting Method by Spherical Correction Value)

The third embodiment is for correcting and designing design values of the use surfaces which are molding surfaces in the upper mold and the lower mold of the mold with which a molded product (optical lens) with the curved surface in the aspherical shape is molded by utilizing the correction information (the entire shape correction information, the shape change rate which is a part of the local shape correction information) which is compiled into database in the aforementioned second embodiment and for molding a molded product (optical lens) with the curved surface in a spherical shape.

The method for compiling the entire shape correction information for molding the optical lens with the curved surface in a spherical shape, and the shape change rate which is a part of the local shape correction information into database for each characteristic of the optical lens with the design curved surface having a spherical shape is the same as the aforesaid second embodiment, and the explanation of the method will be omitted. Here, the characteristics of the above-described optical lens are the lens material of the optical lens with the curved surface in the spherical shape, and the shape of the design curved surface having the spherical shape.

Design of the use surfaces in the upper mold and the lower mold of the mold for molding the optical lens with the curved surface in an aspherical shape starts first with extraction of the entire shape correction information and the shape change rate which is a part of the local shape correction information which are compiled into database and suitable for the optical lens having the aspherical shape.

Namely, the entire shape correction information and the shape change rate that is a part of the local shape correction information, which are compiled into database, about the optical lens which is of the same lens material as the optical lens with the curved surface in the aspherical shape to be molded and includes the design curved surface of the spherical shape having the radius of curvature corresponding to the radius of curvature at the vertex or the average radius of curvature in the design curved surface of the aspherical shape of the optical lens are extracted from the database. Here, the above-described radius of curvature at the vertex means, for example, the radius of curvature at the vertex in the design curved surface of the aspherical shape of the optical lens to be molded. The above-described average radius of curvature means the average radius of curvature in the entire surface of the lens in the design curved surface of the aspherical shape of the optical lens to be molded.

(Aspherical Shape Correcting Method by Spherical Correction Value: Correction Value Calculation from Database)

For example, the case where the radius of curvature at the vertex of the design curved surface of the optical lens with the curved surface to be molded is in an aspherical shape is +2.00 D (diopter) is considered. First, with respect to the optical lens which is of the same lens material as the optical lens to be molded and including the design curved surface of the spherical shape having the radius of curvature corresponding to the above-described radius of curvature at the vertex, the corresponding database is referred to. On the convex surface side, at 2 D of "refractive power expressing the convex surface side lens shape" on the horizontal axis, the corresponding entire shape correction value of −0.100 D on the curve α is taken out as the entire shape correction information from the entire shape correction information shown in, for example, FIG. 12. Meanwhile, on the concave surface side, at 2 D of "refractive power expressing the concave surface side lens shape" on the horizontal axis, the corresponding entire shape correction value of −0.125 D on the curve β is extracted. Similarly, from the shape change rate which is a part of the local shape correction information shown in, for example, FIG. 11 compiled into database, the curve a is taken out as the shape change rate.

Next, the value at an optional position from the lens vertex at the extracted shape change rate is multiplied by the height (Z value) of the design 5 curved surface of the aspherical shape of the optical lens at the corresponding position, and thereby, the local shape correction information at the position is calculated. Then, the local shape correction information is calculated at all the positions of the optical lens with the curved surface in the aspherical shape.

(Aspherical Shape Correcting Method by Spherical Surface Correction Value: Method for Adding Correction Value)

Next, the local shape correction information calculated based on the shape change rate extracted from the database as described above, and the entire shape correction information extracted from the database are added in the Z-direction to the design values of the use surfaces in the upper mold and the lower mold of the mold, which are designed to be the design curved surface of the aspherical shape of the optical lens to be molded.

As for the local shape correction information, for example, the local shape correction information calculated at each position of the optical lens of which curved surface is in the aspherical shape is added in the Z-direction to the design value at each position in the use surfaces of the above-described upper mold and lower mold designed to be the design curved surface of the aspherical shape. As for the entire shape correction information, the entire shape correction information extracted from the database is added in the Z-direction to, for example, the design values at the vertexes in the use surfaces of the above-described upper mold and lower mold, which are designed to be the design values of the aspherical shape.

As described above, the design values of the use surfaces in the upper mold and the lower mold of the mold for molding the optical lens of which curved surfaces are in the aspherical shape are corrected and calculated, and the upper mold and the lower mold of the mold are designed.

(Effect of the Third Embodiment)

Since it is constructed as above, the above-described third embodiment provides the following effect (7) in addition to the effects (1) to (5) of the aforesaid first embodiment.

(7) Information corresponding to an error of the curved surface of the above-described optical lens specified by the equation of the aspherical surface and the design curved surface of the spherical shape of the optical lens is compiled into database for each characteristic of the optical lens as the correction information for molding the optical lens of which curved surface are in spherical shape. Then, by using the correction information compiled into the database, the design values of the use surfaces in the upper mold and the lower mold of the mold for molding the optical lens of which curved surfaces are in the aspherical shapes are corrected and designed. As a result of this, by extracting the correction information suitable for the optical lens having the curved surfaces in the aspherical shapes from the database, the correction information for correcting the design values of the use surfaces in the upper mold and the lower mold of the mold for molding the optical lens of which curved surfaces are in the aspherical shapes can be determined in a short time. As a result, the use surfaces in the upper mold and the lower mold of the mold for molding the optical lens in a desired shape, of which curved surfaces are aspherical surfaces can be efficiently designed.

Figure 13:
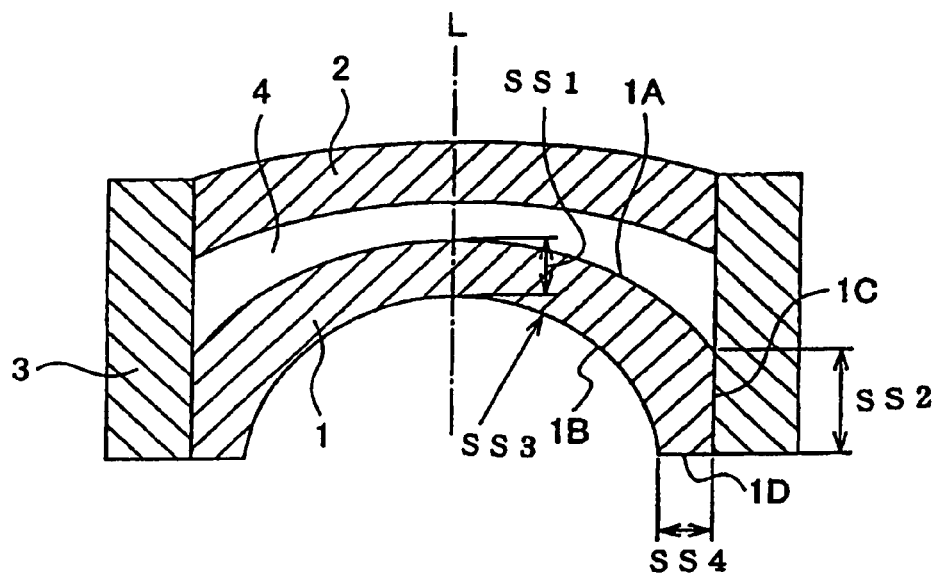
FIG. 13 is a sectional view of an assembled state of a mold designed by a fourth embodiment of the method for designing a mold according to the present invention.
Figure 14:
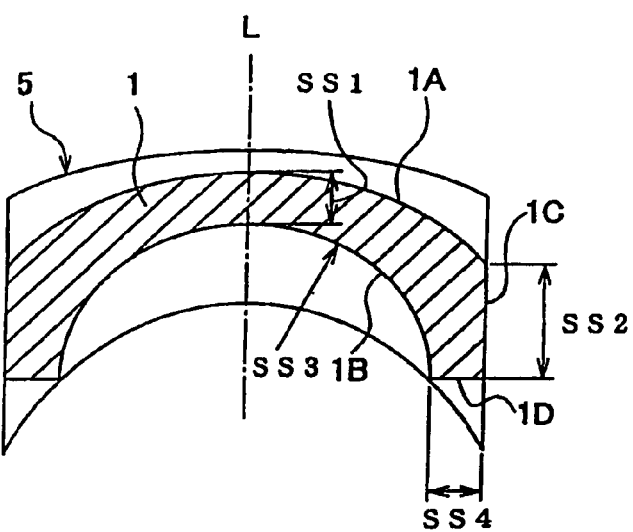
FIG. 14 is a view showing relationship between the size of the lower mold and blanks in the explanatory view of the method for designing a mold in the fourth embodiment.

[D] Fourth Embodiment (FIG. 13, FIG. 14)

(Explanation of Designing Method of Non-Molded Surface)

A fourth embodiment relates to a designing method of a mold in the case of polymerization molding of a plastic lens by using a mold made of glass or ceramics.

Conventionally, for polymerization molding of a plastic lens for spectacle glasses, a mold (also called a molding die) in which a set of upper mold and a lower mold (also called an upper die mold and a lower die mold respectively) made of glass or ceramics are held at a predetermined space by an annular gasket is used. A plastic monomer is charged into the mold and heated and polymerized, and thereby, a plastic lens in a desired shape is obtained.

In the lower mold in this case, an upper surface is formed as a lens transfer surface in a convex surface shape, while a lower surface formed as a non-transfer surface in a concave surface shape, and an outer peripheral part is formed as a cylindrical surface (for example, see Japanese Patent Application Laid-open No. 4-232706). The lens transfer surface is for molding a rear surface (concave surface) of the lens, and therefore, it is specified as a convex curved surface in accordance with the lens design value. On the other hand, the non-transfer surface is the surface which is not used for molding, and therefore, it is generally formed as a concave spherical surface with a proper curvature which satisfies the specifications such as a height dimension of the cylindrical surface (edge thickness).

When producing such a mold, it is usually produced by grinding/polishing blanks of glass of a specified size which is molded in advance. Especially for polishing the concave spherical surface of the non-transfer surface, a polishing tool (polishing plate) is used. Incidentally, the curvature of the non-transfer surface is changed for each mold conventionally, and therefore, a different polishing tool is used for each curvature to be obtained by polishing in the existing state.

As described above, the curvature of the non-transfer surface (concave spherical surface) is conventionally changed for each mold as described above, and thereby, it is necessary to use a different polishing tool for each curvature to be obtained by polishing. Therefore, the kind of polishing tools increases, and there is a problem of increasing cost.

In view of the above-described circumstances, the fourth embodiment has its object to provide a method for designing a mold for a plastic lens which is capable of achieve cost down by decreasing the kind of polishing tools which polishes non-transfer surfaces.

A first construction in the fourth embodiment specifies outer surface shapes of the molds in the lens transfer surfaces, non-transfer surfaces, outer peripheral cylindrical surfaces and flat surfaces when designing a plurality of kinds of molds differing in size. The above-described lens transfer surface is a part of a mold which is composed of a convex curved surface formed to be circular in plane view with an optical axis of the mold as a center. The above-described non-transfer surface is on a back surface side of the lens transfer surface, and is a part of the mold composed of a concave spherical surface formed to be circular in plane view with the above-described same optical axis as the center. The above-described peripheral cylindrical surface is a part of the mold which is formed from an outer circumferential edge of the lens transfer surface to the back surface side with the above-described optical axis as the center. The above-described flat surface is a part of the mold which is formed to be annular at an outer peripheral side of the non-transfer surface, with its own inner peripheral edge intersecting the outer peripheral edge of the non-transfer surface, and with an outer peripheral edge intersecting an end edge of the outer peripheral cylindrical surface. Then, the curve of the lens transfer surface, a wall thickness on the above-described optical axis between the lens transfer surface and the non-transfer surface, and the height of the outer peripheral cylindrical surface are respectively set based on the design data. Further, the width of the annular flat surface is adjusted to correspond to the shape of the blanks of the minimum size from which the mold can be worked to be taken out. In this manner, the curvature of the non-transfer surface composed of the concave spherical surface in each of the molds is made constant.

A second construction in the fourth embodiment is characterized by adjusting the width of the annular flat surface to be 4 mm to 6 mm, in the above-described first construction.

According to the fourth embodiment, the curvature of the concave spherical surface of the non-transfer surface is made constant by adjusting the width of the annular flat surface, and therefore, the kind of polishing tools which polish concave spherical surfaces can be decreased, which results in reduction of working cost of molds.

Hereinafter, the fourth embodiment will be further described with reference to the drawings.

FIG. 13 is a sectional view of a mold for molding a plastic lens. The mold is composed of a lower mold 1, an upper mold 2 and a cylindrical gasket 3, and a cavity 4 of which periphery is surrounded by the gasket 3 is formed between the lower mold 1 and the upper mold 2. Accordingly, by charging a monomer into the cavity 4 and polymerizing it, a plastic lens can be molded.

The outer surface shape of the lower mold 1 in this case is defined by a lens transfer surface 1A, a non-transfer surface 1B, an outer peripheral cylindrical surface 1C and a flat surface 1D. The lens transfer surface 1A is a part of the lower mold 1, which is composed of a convex curved surface formed to be circular in plane view with an optical axis L (center axis) as a center. The non-transfer surface 1B is a part of the lower mold 1, which is composed of a concave spherical surface formed on a back surface side of the lens transfer surface 1A to be circular in plane view with the same optical axis L as a center. Further, the outer peripheral cylindrical surface 1C is a part of the lower mold 1, which is formed from an outer circumferential edge of the transfer surface 1A with the optical axis L as a center to the back surface side. The flat surface 1D is a part of the lower mold 1, which is formed into an annular shape at an outer peripheral side of the non-transfer surface 1B, with its own inner peripheral edge intersecting an outer peripheral edge of the non-transfer surface 1B, and its outer peripheral edge intersecting an end edge of the outer peripheral cylindrical surface 1C.

In this case, a curve of the transfer surface 1A, a wall thickness SS1 on the optical axis L between the transfer surface 1A and the non-transfer surface 1B, and a height SS2 of the outer peripheral cylindrical surface 1C (edge thickness or rim thickness) are respectively set as fixed values based on the design data of the lens. A curvature SS3 of the non-transfer surface 1B and a width SS4 of the annular flat surface 1D are set to the values which can be optionally changed as long as they satisfy the above-described fixed values.

Next, a method for designing the lower mold 1 will be explained.

As shown in FIG. 14, there are the following five elements for determining the shape of the lower mold 1 of the above-described type.

(1) Curve of the transfer surface 1A
(2) Wall thickness SS1
(3) Height SS2 of the outer peripheral cylindrical surface 1C
(4) Curvature SS3 of the non-transference surface 1B
(5) Width SS4 of the annular flat surface 1D Among them, (1) curve of the transference surface 1A, (2) wall thickness SS1 and (3) height SS2 of the outer peripheral cylindrical surface 1C can be fixedly set based on the lens design data, but (4) curvature SS3 of the non-transference surface 1B and (5) width SS4 of the annular flat surface 1D can be optionally changed.

Thus, in the designing method of this embodiment, a blank 5 of the minimum size which can realize (1) curve of the transfer surface 1A, (2) wall thickness SS1 and (3) height SS2 of the outer peripheral cylindrical surface 1C is selected first while (4) curvature SS3 of the non-transfer surface 1B and (5) width SS4 of the annular flat surface 1D are optionally adjusted. Then, the width SS4 of the annular flat surface 1D is adjusted corresponding to the shape of the blank 5, and thereby, the curvature SS3 of the non-transfer surface 1B composed of a concave spherical surface in each mold is made constant.

As described above, the curvatures SS3 of the non-transfer surfaces 1B are made constant in a plurality of kinds of molds, and the non-transfer surfaces 1B are formed into the same spherical shape, whereby the polishing tool used in a polishing process of the non-transfer surface 1B can be used in common. Accordingly, the production cost of molds can be reduced. In this case, the width SS4 of the annular flat part 1D is set in the range of 4 mm to 6 mm, and is preferably processed within the limits of the size of the blank 5.

Consequently, according to the fourth embodiment, the following effect (14) is provided.

(14) Since the curvature SS3 of the concave spherical surface of the non-transfer surface 1B is made constant by adjusting the width SS4 of the annular flat surface 1D, the kind of polishing tools for polishing the concave spherical surface can be reduced, and thereby the processing cost of the mold 10 can be reduced.

INDUSTRIAL AVAILABILITY

The present invention is described based on the above-described each embodiment thus far, but the present invention is not limited to this.

For example, in the embodiments, the optical lens is manufactured by being molded by using the cast method, but the present invention can be also applied to the case where the optical lens is manufactured according to the manufacturing method other than the cast method. In concrete, in the case where the plastic lens is directly cut and polished, the present invention can be applied to cut surface shape data correction in a grinding process, the shape correction and the refractive power correction of the polishing tool (polishing plate) in a polishing process. Further, the present invention is applicable to correction or the like of a slumping mold.

Besides, the case where the mold is glass is described in the above-described embodiments, but the present invention can be applied to other molds with a high thermal shrinkage factor, for example, in the case of molding by a metal mold.

In the above-described embodiments, the case where the optical lens of which surface is in a spherical shape is described as the test molded product. However, an optical lens of which surface is in an aspherical shape can be applied as the test molded product.

Further, in the above-described embodiment, the case of the optical lens of which surface is in a spherical shape and is rotationally symmetrical, or the optical lens of which surface is in an aspherical shape is described as a finished molded product, but the optical lenses having a toric surface, an atoric surface and the like can be made as finished molded products. Here, the toric surface means the surface which has two principal meridians orthogonal to each other, with each principal meridians constructed by a spherical shape. The atoric surface means the surface with each of its principal meridians constructed by an aspherical shape.

The invention claimed is:

1. A method for designing a mold, comprising:
    preparing a mold of which a molding surface is formed to be a design curved surface of a molded product;
    measuring a curved surface shape of a molded product which is molded from the mold, and specifying a curved surface of the molded product by approximating a measured value by an equation of an aspherical surface;
    comparing the specified curved surface of the molded product and the design curved surface of the molded product to obtain an error of both the curved surfaces; and
    correcting the molded surface of the mold by using information corresponding to the error as correction information to design the molded surface,
    wherein said correction information includes entire shape correction information correcting an entire shape of the molding surface of the mold to cope with an error of a spherical shape component in the curved surface of the molded product, and local shape correction information correcting a local shape of the above-described molding surface of the mold to cope with an error of a component other than the spherical shape in the curved surface of the molded product, said entire shape correction information and said local shape correction information are independently calculated, the shape of said molded surface of said mold is corrected by using said entire shape correction information and said local shape correction information, and the equation of the aspherical surface is the following equation:

$$Z = \frac{C\rho^2}{1 + \sqrt{1 - (1+K)C^2\rho^2}} + \sum_{i=2}^{m} A_{2i}\rho^{2i} \quad (1)$$

where Z is a distance measured from a vertex of the molded product in an axial direction of the molded product, ρ satisfies $\rho^2 = X^2 + Y^2$ when X and Y are distances measured in a perpendicular direction to the above-described axis from the above-described vertex, a vertex curvature C satisfies C=1/R when R is set as a radius of curvature at the vertex, K is a conic coefficient, and $A_{2i}$ is an aspherical coefficient (i is an integer).

2. The method for designing a mold according to claim 1, wherein in the aspherical coefficient $A_{2i}$, i is 2 to 5.

3. The method for designing a mold according to claim 1, further comprising:
    obtaining the entire shape correction information correcting the entire shape of the molding surface of the mold to cope with the error of the spherical shape component in the curved surface of the molded product, according to a reference spherical component which is a first term (K=0) of the equation (1); and
    obtaining the local shape correction information correcting a local shape of the molding surface of the mold to cope with the error of a component other than the spherical shape in the curved surface of the molded product, according to a polynomial component which is a second term of the equation (1).

4. The method for designing a mold according to claim 3, wherein the entire shape correction information in the molding surface of the above-described mold is determined based on a difference between a radius of curvature of a reference spherical surface expressed by the reference spherical surface component which is the first term (K=0) of the equation (1) and an average radius of curvature in the entire design curved surface of the molded product or a radius of curvature in a vertex refractive power.

5. The method for designing a mold according to claim 3, wherein the local shape correction information in the molding surface of the mold is determined based on a shape change rate which is expressed by the polynomial component that is the second term of the equation (1) and is calculated by using a height (Z value) of a component other than the spherical shape in the curved surface of the molded product, and a height (Z value) of the design curved surface of the molded product.

6. The method for designing a mold according to claim 3, wherein a design of the molding surface of the mold is made by adding the entire shape correction information and the local shape correction information to the design curved surface of the molded product.

7. A method for designing a mold, comprising:
    preparing a mold of which a molding surface is formed to be a design curved surface of a molded product;
    measuring a curved surface shape of a molded product which is molded from the mold, and specifying a curved surface of the molded product by approximating a measured value by an equation of an aspherical surface;
    comparing the specified curved surface of the molded product and the design curved surface of the molded product to obtain an error of both the curved surfaces; and
    correcting the molded surface of the mold by using information corresponding to the error as correction information to design the molded surface,
    wherein said correction information includes entire shape correction information correcting an entire shape of the molding surface of the mold to cope with an error of a spherical shape component in the curved surface of the molded product, and local shape correction information correcting a local shape of the above-described molding surface of the mold to cope with an error of a component other than the spherical shape in the curved surface of the molded product, said entire shape correction information and said local shape correction information are independently calculated, the shape of said molded surface of said mold is corrected by using said entire shape correction information and said local shape correction information, and the equation of the aspherical surface is the following equation:

$$Z = \sum_{i=1}^{m} B_{2i}\rho^{2i} \quad (2)$$

which is obtained by transforming the following equation:

$$Z = \frac{C\rho^2}{1 + \sqrt{1 - (1+K)C^2\rho^2}} + \sum_{i=2}^{m} A_{2i}\rho^{2i} \quad (1)$$

where Z is a distance measured from a vertex of the molded product in an axial direction of the molded product, p satisfies $p^2 = X^2 + Y^2$ X and Y are distances measured in a perpendicular direction to the above-described axis from the above-described vertex, a vertex curvature C satisfies C=1/R when R is set as a radius of curvature at the vertex, K is a conic coefficient, and $A_{2i}$ is an aspherical coefficient (i is an integer) and B is a coefficient including the vertex curvature C and the aspherical coefficient $A_{2i}$ of the equation (1).

8. The method for designing a mold according to claim 7, further comprising:
  obtaining the vertex curvature C and an aspherical coefficient AA of the equation (1) from a coefficient $B_{21}$ of equation (2), and determining the curved surface of the molded product by the equation (1);
  obtaining the entire shape correction information correcting the entire shape of the molding surface of the mold to cope with an error of the spherical shape component in the curved surface of the molded product, according to the reference spherical component which is the first term (K=O) of the equation (1); and
  obtaining the local shape correction information correcting the local shape of the above-described molding surface of the mold to cope with the error of a component other than the spherical shape in the curved surface of the molded product, according to the polynomial component that is the second term of equation (1).

* * * * *